US009560624B2

(12) United States Patent
Edge

(10) Patent No.: US 9,560,624 B2
(45) Date of Patent: *Jan. 31, 2017

(54) METHOD AND APPARATUS FOR CONFIGURING AND LOCATING A HOME BASE STATION

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 176 days.

This patent is subject to a terminal disclaimer.

(21) Appl. No.: 14/051,243

(22) Filed: Oct. 10, 2013

(65) Prior Publication Data

US 2014/0038642 A1 Feb. 6, 2014

Related U.S. Application Data

(63) Continuation of application No. 13/308,134, filed on Nov. 30, 2011, now Pat. No. 8,600,403.
(Continued)

(51) Int. Cl.
*H04W 64/00* (2009.01)

(52) U.S. Cl.
CPC .................................. *H04W 64/003* (2013.01)

(58) Field of Classification Search
CPC ........ H04W 4/02; H04W 4/023; H04W 4/025; H04W 60/00; H04W 64/00; H04W 64/003; H04W 84/045; H04W 88/08; G01S 5/0242; G01S 5/0263; G01S 5/0268; G01S 5/0284
(Continued)

(56) References Cited

U.S. PATENT DOCUMENTS 7,831,216 B1 11/2010 Yenney et al.
8,644,855 B2 2/2014 Kolhe
(Continued)

FOREIGN PATENT DOCUMENTS

EP 1617696 A1 1/2006
JP 2001309421 11/2001
(Continued)

OTHER PUBLICATIONS

3GPP TS 36.305 v9.1.0 (Dec. 2009) 3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 9).*
(Continued)

*Primary Examiner* — Michael Mapa
(74) *Attorney, Agent, or Firm* — Arent Fox LLP

(57) ABSTRACT

Techniques for configuring a Home evolved Node B (HeNB) in a location server and positioning the HeNB are disclosed. In one aspect, location for a HeNB is supported based on LTE Positioning Protocol (LPP) messages. The HeNB communicates LPP messages with a location server. These LPP messages are terminated at the HeNB instead of a UE. At least one location transaction for the HeNB can be performed to configure in the location server and/or locate the HeNB based on the LPP messages. In another aspect, location for a HeNB is supported based on an embedded UE in the HeNB. The HeNB establishes a location session with a location server based on an embedded UE ID, which is assigned to the HeNB and recognized by the location server as being for a HeNB instead of a UE. At least one location transaction for the HeNB is performed during the location session.

19 Claims, 13 Drawing Sheets

Related U.S. Application Data

(60) Provisional application No. 61/419,695, filed on Dec. 3, 2010.

(58) Field of Classification Search
USPC ............ 455/404.2, 414.2, 410, 435.1, 444,455/448–449, 456.1–457
See application file for complete search history.

(56) References Cited

U.S. PATENT DOCUMENTS

| | | |
|---|---|---|
| 2002/0150092 A1 | 10/2002 | Bontempi et al. |
| 2004/0043773 A1 | 3/2004 | Lee et al. |
| 2004/0147232 A1 | 7/2004 | Zodnik |
| 2004/0180655 A1 | 9/2004 | Jang et al. |
| 2005/0144647 A1 | 6/2005 | Zussman et al. |
| 2006/0014517 A1 | 1/2006 | Barclay et al. |
| 2006/0286961 A1 | 12/2006 | Levitan et al. |
| 2006/0293066 A1 | 12/2006 | Edge et al. |
| 2007/0135089 A1 | 6/2007 | Edge et al. |
| 2007/0182547 A1 | 8/2007 | Wachter et al. |
| 2007/0238448 A1 | 10/2007 | Gallagher et al. |
| 2007/0293215 A1 | 12/2007 | Dawson |
| 2007/0293239 A1 | 12/2007 | Dawson et al. |
| 2008/0008157 A1 | 1/2008 | Edge et al. |
| 2008/0076425 A1 | 3/2008 | Khetawat et al. |
| 2008/0085699 A1 | 4/2008 | Hirano et al. |
| 2008/0090587 A1 | 4/2008 | Krause et al. |
| 2008/0188243 A1* | 8/2008 | Giustina ............ H04W 24/02 455/456.6 |
| 2008/0267114 A1 | 10/2008 | Mukherjee et al. |
| 2008/0273670 A1 | 11/2008 | Dickinson |
| 2008/0305792 A1 | 12/2008 | Khetawat et al. |
| 2009/0135784 A1* | 5/2009 | Horn et al. .................. 370/331 |
| 2009/0181698 A1 | 7/2009 | Farmer et al. |
| 2009/0265543 A1 | 10/2009 | Khetawat et al. |
| 2009/0298515 A1* | 12/2009 | Czaja ................ H04L 7/041 455/456.5 |
| 2009/0311987 A1 | 12/2009 | Edge et al. |
| 2010/0014459 A1* | 1/2010 | Mir .................. H04L 45/60 370/328 |
| 2010/0041364 A1* | 2/2010 | Lott .................. G06Q 30/016 455/404.1 |
| 2010/0041418 A1 | 2/2010 | Edge et al. |
| 2010/0056177 A1 | 3/2010 | Kojima |
| 2010/0120447 A1 | 5/2010 | Anderson et al. |
| 2010/0240397 A1 | 9/2010 | Buchmayer et al. |
| 2011/0003602 A1 | 1/2011 | Kim et al. |
| 2011/0013528 A1 | 1/2011 | Chen |
| 2011/0039577 A1 | 2/2011 | Stern-Berkowitz et al. |
| 2011/0098057 A1 | 4/2011 | Edge et al. |
| 2011/0250906 A1 | 10/2011 | Siomina et al. |
| 2011/0256875 A1 | 10/2011 | Edge et al. |
| 2012/0142313 A1 | 6/2012 | Edge |
| 2012/0214539 A1* | 8/2012 | Michel ................ H04W 52/367 455/522 |
| 2013/0109345 A1 | 5/2013 | Edge et al. |

FOREIGN PATENT DOCUMENTS

| | | |
|---|---|---|
| JP | 2004/502387 A | 1/2004 |
| JP | 2007251357 A | 9/2007 |
| JP | 2009509423 | 3/2009 |
| JP | 2009510970 A | 3/2009 |
| JP | 2009200644 A | 9/2009 |
| JP | 2009543480 A | 12/2009 |
| JP | 2010-062770 A | 3/2010 |
| JP | 2010507963 A | 3/2010 |
| JP | 2010518670 A | 5/2010 |
| KR | 20070092538 A | 9/2007 |
| RU | 2263412 C2 | 3/2004 |
| WO | 0152569 A1 | 7/2001 |
| WO | WO-02/03718 A2 | 1/2002 |
| WO | WO-2007/002303 A1 | 1/2007 |
| WO | 2007035736 | 3/2007 |
| WO | WO-2007/025143 A1 | 3/2007 |
| WO | 2007040450 A1 | 4/2007 |
| WO | 2008051124 A1 | 5/2008 |
| WO | 2008051929 A2 | 5/2008 |
| WO | 2008070842 A1 | 6/2008 |
| WO | 2008093103 A2 | 8/2008 |
| WO | 2009058068 | 5/2009 |
| WO | WO-2009/089486 A1 | 7/2009 |
| WO | WO-2010056453 A1 | 5/2010 |

OTHER PUBLICATIONS

3GPP: "3rd Generation Partnership Project; Technical Specification Group Radio Access Network; Home (e)NodeB; Network aspects(Release 8)" 3GPP Draft; R3-083410_R3.020_V0.9.1_CLEAN_V2, 3rd Generation Partnership Project (3GPP), Mobile Competence Centre; 650, Route Des Lucioles; F-06921 Sophia-Antipolis Cedex; France, no. Prague, Czech Republic; 20081117, Nov. 17, 2008 (Nov. 17, 2008), XP050324621, p. 55; figures 6.2.1.2.3-1, p. 51-p. 63.

3GPP TS 25.453 V9.1.0 ,"3rd Generation Partnership Project; Technical Specification Group Radio Access Network; UTRAN Iupc interface Positioning Calculation Application Part (PCAP) signalling (Release 9)", Apr. 2010.

3rd Generation Partnership Project, Technical Specification Group Radio Access Network, Evolved Universal Terrestrial Radio Access Network (E-UTRAN), Stage 2 functional specification of User Equipment (UE) positioning in E-UTRAN (Release 9), 3GPP Standard, 3GPP TS 36.305, 3rd Generation Partnership Project (3GPP), Mobile Competence Centre, 650, Route Des Lucioles, F-06921 Sophia-Antipolis Cedex, France, No. V9.1.0, Dec. 28, 2009 (Dec. 28, 2009), pp. 1-52, XP050401613, [retrieved on Dec. 28, 2009].

3rd Generation Partnership Project; Technical Specification Group Servi ces and System Aspects; Evaluation of LCS Control Plane Solutions for EPS (Release 9), 3GPP Standard; 3GPP TR 23.891, 3rd, Generation Partnership Project (3GPP), Mobile Competence Centre ; 650, Route Des Lucioles ; F-06921 Sophia-Anti Pol1 S Cedex ; France, No. V.9.0.0, Mar. 1, 2009 (Mar. 1, 2009), pp. 1-64, XP050364142, p. 29 p. 35-p. 38.

3rd Generation Partnership Project; Technical Specification Group Services and System Aspects; Evaluation of LCS Control Plane Solutions for EPS (Release 9), 3GPP Standard; 3GPP TR 23.891, 3rd Generation Partnership Project (3GPP), Mobile Competence Centre ; 650, Route Des Lucioles ; F-06921 Sophia-Antipolis Cedex ; France, No. V.0.4.0, Feb. 1, 2009, pp. 1-64, XP050380738.

3rd Generation Partnership Project; Technical Specification Group Services and System Aspects; Functional stage 2 description of Location Services (LCS) (Release 9 ), 3GPP Standard; 3GPP TS 23.271, 3rd Generation Partnership Project (3GPP), Mobile Competence Centre ; 650, Route Des Lucioles ; F-06921 Sophia-Antipolis Cedex ; France, No. V9.3.0, Mar. 25, 2010, pp. 1-169, XP050402061, [retrieved on Mar. 25, 2010].

3rd Generation Partnership Project; Technical Specification Group Services and System UTRAN Iupc interface Positioning Calculation Application Part (PCAP) signalling (Release 9), 3GPP Standard; 3GPP TR 23.891, 3rd Generation Partnership Project (3GPP), Mobile Competence Centre ; 650, Route Des Lucioles ; F-06921 Sophia-Antipolis Cedex ; France, No. V9.1.0, Mar. 31, 2010, pp. 1-49, XP055055712, Retrieved from the Internet: URL: www.3gpp.org [retrieved on Mar. 7, 2013].

Ericsson: "LTE positioning protocol architecture", 3GPP Draft, R3-091165, 3rd Generation Partnership Project (3GPP), Mobile Competence Centre, 650, Route Des Lucioles, F-06921 Sophia-Antipolis Cedex, France, no. San Francisco, USA, 20090429, Apr. 29, 2009 (Apr. 29, 2009), XP050341534, [retrieved on Apr. 29, 2009].

Goze T. et al., "Secure User-Plane Location (SUPL) Architecture for Assisted GPS (A-GPS)", 4th Advanced Satellite Mobile Systems (ASMS), Aug. 26, 2008, pp. 229-234, IEEE, Piscataway, NJ, USA, XP031393759, ISBN: 978-1-4244-2160-2.

(56) References Cited

OTHER PUBLICATIONS

International Search Report and Written Opinion—PCT/US2009/047484—ISA/EPO—Sep. 10, 2009.
International Search Report and Written Opinion—PCT/US2011/032567—ISA/EPO—Mar. 19, 2013.
International Search Report and Written Opinion—PCT/US2011/062879—ISA/EPO—Feb. 21, 2012.
Kim H.S, et al., "Performance Analysis of Position Location Methods based on IS-801 Standard" Proceedings of the Institute of Navigation (ION) GPS, XX, XX, Sep. 22, 2000 (Sep. 22, 2000), pp. 545-553, XP002315981, p. 547, left-hand column, line 1-line 18.
Qualcomm Incorporated, Draft work item proposal: Positioning enhancements for HNB/HeNB, 3GPP TSG RAN Meeting #51, RP-110367, Kansas City, USA, Mar. 15-18, 2011, 5 pages.
Taiwan Search Report—TW098120115—TIPO—Feb. 23, 2013.
Taiwan Search Report—TW100113019—TIPO—Aug. 27, 2013.
European Search Report—EP14152333—Search Authority—Munich—Apr. 10, 2014. (9 total pages).
Wang S. et al., "Location Based Services for Mobiles: Technologies and Standards", 2008 IEEE International Conference on Communications Workshops, ICC 2008, Workshops Proceedings, [Beijing, China, May 19-23, 2008], IEEE, Piscataway, NJ, May 19, 2008 (May 19, 2008], pp. 1-123, XP002633307, ISBN: 978-1-4244-2051-3 Retrieved from the Internet: URL: http://to.swang.googlepages.com/ICC2008LBSforMobilessimplifiedR2.pdf [retrieved on Apr. 18, 2011].
LTE; Evolved Universal Terrestrial Radio Access Network (E-UTRAN), Stage 2 functional specification of User Equipment (UE) Positioning in E-UTRAN (3GPP TS 36.305 version 9.4.0 Release 9), 2010/10Parts 6.2.1, 6.3.1, 6.5.2, 7.1.1, 7.1.2.1, 7.1.2.3, 7.3.2, Figs. 6.4.2-1, 7.1.2.3-1 and 7.1.2.4-1.
Taiwan Search Report—TW104113947—TIPO—Jun. 24, 2016.

\* cited by examiner

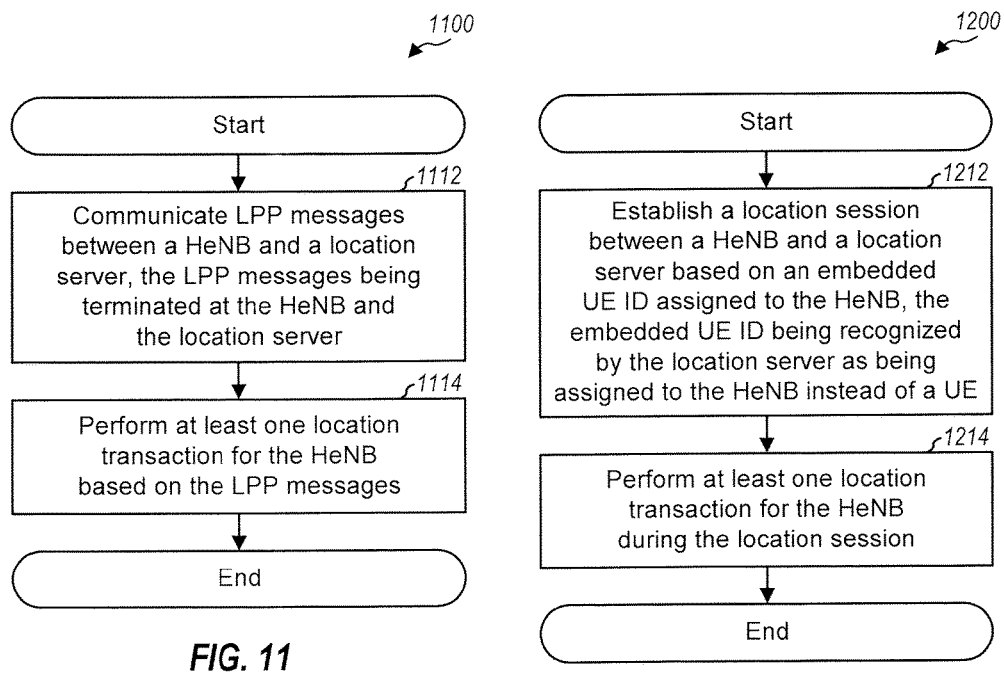

METHOD AND APPARATUS FOR CONFIGURING AND LOCATING A HOME BASE STATION

Claim of Priority under 35 U.S.C. §120

The present Application for Patent is a Continuation of Patent Application No. 13/308,134 entitled "METHOD AND APPARATUS FOR CONFIGURING AND LOCATING A HOME BASE STATION," filed Nov. 30, 2011, pending, which claims priority to Patent Application No. 61/419,695 entitled "Location Solutions For A Home eNodeB (HeNB)," filed Dec. 3, 2010, both of which are assigned to the assignee hereof and hereby expressly incorporated by reference herein.

BACKGROUND

I. Field

The present disclosure relates generally to communication, and more specifically to techniques for supporting location for a home base station in a wireless network.

II. Background

Home base stations are base stations designed to serve relatively small geographic areas and are widely deployed at various locations such as homes, offices, shops, apartments, etc. These home base stations are often used to improve radio coverage, increase throughput, reduce load on macro-cellular networks, and/or provide other benefits for network operators and/or users. Unlike macro base stations that are carefully deployed at specific locations and maintained by network operators, home base stations may be flexibly deployed in an unplanned manner at any location by users but typically use licensed radio frequencies of the network operators.

A home base station may support communication for one or more User Equipments (UEs) within its coverage. It may be desirable to know the location of the home base station and/or a UE communicating with the home base station. For example, it may be necessary to know the location of the home base station in order to ensure that it is authorized to operate at its current location (e.g., is within a geographic area for which an associated network operator has a license to use the radio frequencies supported by the home base station). As another example, a user of a UE may place an emergency call using the home base station. The location of the UE may then be determined and used to send emergency assistance to the user. There are many other scenarios in which knowledge of the location of the home base station and/or the UE may be useful or necessary.

A home base station is typically installed indoors and may be located deep inside a building or underground. Hence, determining the location of the home base station or of a UE accessing the home base station may be problematic, e.g., subject to failure or inaccuracy. There may thus be a premium on methods that can reliably and accurately locate the home base station and/or the UE accessing the home base station.

SUMMARY

Techniques for configuring a Home evolved Node B (HeNB) in a location server and for locating/positioning the HeNB are described herein. A HeNB is a home base station and is referred to by this name in some wireless radio technologies such as Long Term Evolution (LTE). The terms "HeNB" and "home base station" are synonymous and are used interchangeably herein. The terms "location" and "position" are also synonymous and are used interchangeably herein.

In one aspect, location for a HeNB may be supported based on LTE Positioning Protocol (LPP) messages. In one design, the HeNB may communicate LPP messages with a location server, and the LPP messages may be terminated at the HeNB (instead of a UE) and the location server. At least one location transaction for the HeNB may be performed based on the LPP messages. For example, the at least one location transaction may be for configuring the HeNB in the location server and/or locating the HeNB.

In another aspect, location for a HeNB may be supported based on an embedded UE in the HeNB. The embedded UE may enable the HeNB to emulate a UE, so that certain procedures applicable for UEs can be used for the HeNB. In one design, the HeNB may establish a location session with a location server based on an embedded UE identity (ID) assigned to the HeNB. The embedded UE ID may be recognized by the location server as being assigned to the HeNB instead of a UE. At least one location transaction for the HeNB (e.g., to configure the HeNB in the location server and/or to locate the HeNB) may be performed during the location session.

Various aspects and features of the disclosure are described in further detail below.

BRIEF DESCRIPTION OF THE DRAWINGS

FIGS. 11 and 12 show two processes for supporting location for a HeNB.

DETAILED DESCRIPTION

Figure 1:
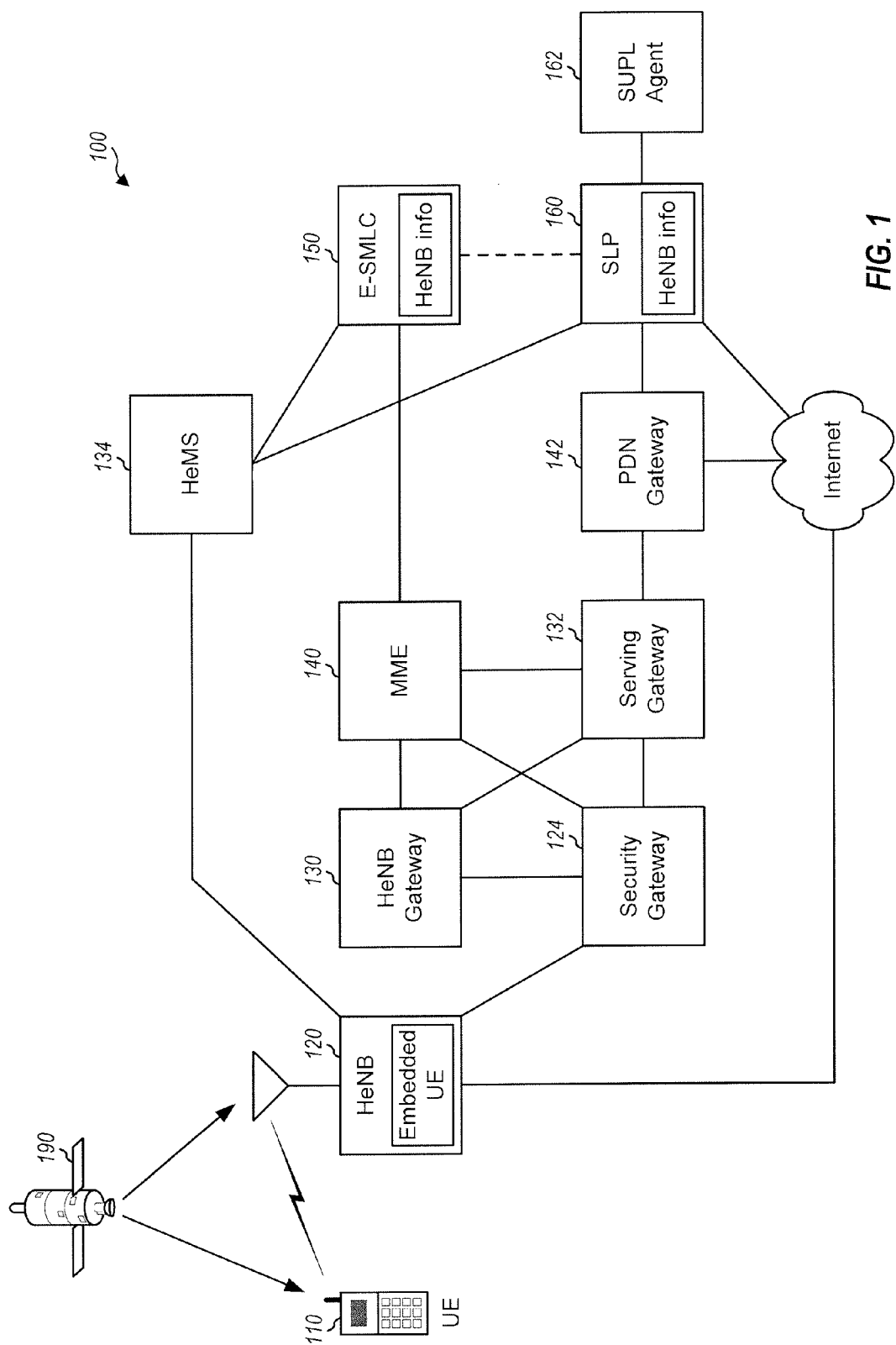
FIG. 1 shows a wireless network supporting communication and location.

The techniques described herein for configuring and locating HeNBs may be used for various wireless networks and radio technologies such as those defined by organizations named "3rd Generation Partnership Project" (3GPP) and "3rd Generation Partnership Project 2" (3GPP2). For example, the techniques may be used for an LTE/LTE-Advanced network, a Wideband Code Division Multiple Access (WCDMA) network, a CDMA 1X network, a CDMA EvDO network, a Global System for Mobile Communications (GSM) network, etc. LTE/LTE-Advanced, WCDMA, and GSM are described in documents from 3GPP. CDMA 1X and CDMA EvDO are described in documents from 3GPP2. The techniques may also be used for other wireless networks (e.g., other 3GPP and 3GPP2 networks)

and other radio technologies. For clarity, certain aspects of the techniques are described below for LTE/LTE-Advanced, and LTE/LTE-Advanced terminology is used in much of the description below.

The techniques described herein may be used to support location services (LCS). Location services refer to any services based on or related to location information. Location information may include any information related to the location of a device, e.g., a location estimate, measurements, etc. Location services may include positioning, which refers to a functionality that determines, e.g., a geographical or civic location of a target device. Location services may also include activities that assist positioning such as transfer of assistance data to a UE to assist the UE to make location related measurements and determine its own location.

The techniques described herein may be used with various user plane and control plane location solutions/architectures that can support location services. A user plane location solution is a location solution or system that sends messages for location services via a user plane. A user plane is a mechanism for carrying signaling and data for higher-layer applications and employing a user-plane bearer, which is typically implemented with standard protocols such as User Datagram Protocol (UDP), Transmission Control Protocol (TCP), and Internet Protocol (IP). A control plane location solution is a location solution that sends messages for location services via a control plane. A control plane is a mechanism for carrying signaling for higher-layer applications and is typically implemented with network-specific protocols, interfaces, and signaling messages. Messages supporting location services are carried as part of signaling in a control plane location solution and as part of traffic data (from a network perspective) in a user plane location solution. The content of the messages may, however, be the same or similar in both user plane and control plane location solutions. An example of user plane location solution includes Secure User Plane Location (SUPL) from Open Mobile Alliance (OMA). SUPL is described in OMA Technical Specification (TS) OMA-TS-ULP-V2_0 for SUPL Version 2.0 and in OMA TS OMA-TS-ULP-V3_0 for SUPL version 3.0. Some examples of control plane location solutions include (i) a 3GPP control plane location solution described in 3GPP TS 23.271, TS 43.059, TS 25.305, and TS 36.305 and (ii) a 3GPP2 control plane location solution described in TIA IS-881 and 3GPP2 TS X.S0002. These various documents are publicly available.

The techniques described herein may also be used with various positioning protocols such as (i) LTE Positioning Protocol (LPP), LPP annex (LPPa), Radio Resource LCS Protocol (RRLP), and Radio Resource Control (RRC) defined by 3GPP, (ii) C.S0022 (also known as IS-801) defined by 3GPP2, and (iii) LPP Extensions (LPPe) defined by OMA. LPP is described in 3GPP TS 36.355, RRLP is described in 3GPP TS 44.031, RRC is described in 3GPP TS 25.331, LPPa is described in 3GPP TS 36.455, and LPPe is described in OMA TS OMA-TS-LPPe-V1_0. These documents are publicly available. A positioning protocol may be used to coordinate and control positioning of devices. A positioning protocol may define (i) procedures that may be executed by a location server and a device being positioned and (ii) communication or signaling between the device and the location server.

FIG. 1 shows a wireless network 100 that supports communication and location services. A HeNB 120 may be deployed by a user at any location (e.g., a home or an office) to support radio communication for UEs within the coverage of HeNB 120. A HeNB may also be referred to as a home base station, a femto access point (FAP), a Home Node B (HNB), a femtocell, etc. HeNB 120 may support radio access using LTE and/or some other radio technology and may include embedded UE functionality.

A Home eNodeB Management System (HeMS) 134 may configure HeNB 120 and other HeNBs for operation, e.g., as defined by a network operator with which HeNB 120 is registered. HeNB 120 may couple to a Security Gateway (SeGW) 124 (e.g., directly, via a router, or via the Internet), which may provide security (e.g., to the rest of the network) for access via HeNB 120. A HeNB Gateway (GW) 130 may be coupled to Security Gateway 124 and may support inter-working between the HeNBs and other network entities. A Mobility Management Entity (MME) 140 may perform various control functions such as mobility management, gateway selection, authentication, bearer management, etc. A Serving Gateway (SGW) 132 may perform various functions related to data transfer for UEs such as data routing and forwarding, mobility anchoring, etc. HeNB 120 may connect to Serving Gateway 132 and/or MME 140 either via only Security Gateway 124 or via Security Gateway 124 followed by HeNB Gateway 130. A Packet Data Network (PDN) Gateway 142 may perform various functions such as maintenance of data connectivity for UEs, IP address allocation, IP anchoring and routing, etc.

An Enhanced Serving Mobile Location Center (E-SMLC) 150 may support location for UEs communicating with wireless network 100. E-SMLC 150 may perform various functions to support location services such as (i) computing location estimates for UE and/or HeNBs from measurements provided by the UEs and/or HeNBs and (ii) providing assistance data to the UEs and/or HeNBs. E-SMLC 150 may also be referred to as a location center, a location server, a positioning center, a standalone SMLC (SAS), a Position Determination Entity (PDE), etc. A SUPL Location Platform (SLP) 160 may support positioning and location services. SLP 160 may include a SUPL Location Center (SLC) and possibly a SUPL Positioning Center (SPC). The SLC may perform various functions for location services, coordinate the operation of SUPL, and interact with SUPL enabled terminals (SETs). The SPC may support positioning for SETs and delivery of assistance data to the SETs and may also be responsible for messages and procedures used for position calculation. E-SMLC 150 may communicate with SLP 160, e.g., via a proprietary interface as indicated by a dashed line in FIG. 1. HeNB 120 may communicate with E-SMLC 150 and/or SLP 160 via the network entities shown in FIG. 1 and/or via other network entities. HeNB 120 may also communicate with SLP 160 via the Internet. A SUPL agent 162 may be an entity that desires location information and may communicate directly or indirectly with SLP 160 to obtain the location information. SUPL agent 162 may also be referred to as a location services (LCS) client and may be external to a UE (as shown in FIG. 1), or resident on the UE, or in communication with the UE.

For simplicity, FIG. 1 shows only some network entities that may be present in wireless network 100. Wireless network 100 may include other network entities. For example, wireless network 100 may also include evolved NodeBs (eNodeBs), Gateway Mobile Location Centers (GMLCs), an IP Multimedia Subsystem (IMS), Radio Network Controllers (RNCs), Base Station Controllers (BSCs), Mobile Switching Centers (MSCs), Serving GPRS Support Nodes (SGSNs), base stations, etc. eNodeBs may support radio access in macrocells for LTE. GMLCs may support location services for external location clients for the 3GPP control plane solution. An IMS may support services based on IP signaling and IP data (e.g., Voice over IP (VoIP)). RNCs may support radio access for WCDMA. MSCs may perform switching functions for circuit-switched (CS) calls and may also route Short Message Service (SMS) messages. SGSNs may perform signaling, switching, and routing functions for packet-switched (PS) connections and sessions for UEs. Wireless network 100 may have access to other networks, e.g., other wireless networks and/or the Internet.

A UE 110 may be one of any number of UEs supported by wireless network 100. UE 110 may be stationary or mobile and may also be referred to as a mobile station, a terminal, an access terminal, a subscriber unit, a station, a SET, etc. UE 110 may be a cellular phone, a smart phone, a tablet, a personal digital assistant (PDA), a wireless device, a wireless modem, a laptop computer, a netbook, a smartbook, a telemetry device, a tracking device, etc. UE 110 may be able to communicate with HeNBs and macro base stations (e.g., eNodeBs) to obtain communication services.

UE 110 and/or HeNB 120 may support one or more positioning methods such as standalone Global Navigation Satellite System (GNSS), assisted GNSS (A-GNSS), Observed Time Difference of Arrival (OTDOA), Uplink Time Difference of Arrival (U-TDOA), Enhanced Cell ID (ECID), etc. Any one of these positioning methods may be used to determine the location of UE 110 or HeNB 120.

UE 110 and/or HeNB 120 may receive and measure signals from one or more satellites 190 and may obtain pseudo-range measurements for the satellites. Satellites 190 may be part of a GNSS, which may be the United States Global Positioning System (GPS), the European Galileo system, the Russian GLONASS system, the Chinese Compass system, or some other GNSS. In the description herein, the term "GNSS" generically refers to any satellite system or any combination of satellite systems supporting positioning, such as GPS, Galileo, GLONASS, Compass, etc. UE 110 and/or HeNB 120 may also measure signals from macro base stations (e.g., eNodeBs) and/or HeNBs (not shown in FIG. 1) and obtain timing measurements, signal strength measurements, signal quality measurements, and/or identification information for the base stations and/or HeNBs. The measurements for satellites, base stations, and/or HeNBs and possibly the identification information for the base stations and/or HeNBs may be used to derive a location estimate for UE 110 or HeNB 120. A location estimate may also be referred to as a position estimate, a position fix, a location, etc.

HeNB 120 may be deployed at any location in an ad-hoc manner. It may be desirable to ascertain the location of HeNB 120, especially at initialization, so that a determination can be made as to whether HeNB 120 is authorized to operate at the deployed location. HeNB 120 may autonomously determine its location based on standalone GNSS. However, HeNB 120 may be located indoors (which may typically be the case) and may be unable to measure signals from a sufficient number of satellites for use to compute its location. It may also be desirable to inform a location server (e.g., E-SMLC 150 or SLP 160 in FIG. 1) of the presence of HeNB 120 together with its location. This knowledge may be useful to support location services for HeNB 120, other HeNBs, and/or UEs.

In an aspect, positioning of a HeNB and configuring of the HeNB in a location server may be supported in order to provide location services for the HeNB and possibly other entities. Supporting HeNB positioning may enable the location of the HeNB to be accurately determined during and/or after initialization of the HeNB. Supporting configuring of the HeNB in a location server may enable positioning of UEs and/or HeNBs that can receive a signal from the HeNB. For example, the HeNB location may be used as a good approximation of the location of a UE that is able to access the HeNB since HeNB coverage is typically small (e.g., approximately 50 meters or less). Thus, if a UE is being located by a location server (e.g., by E-SMLC 150 or SLP 160 in FIG. 1) and the UE or some other entity (e.g., MME 140) provides the identity of a serving cell for the UE to the location server and if the serving cell corresponds to a HeNB that has been configured in the location server, then the location server can use the configured HeNB location as an approximation of the UE location.

Table 1 lists four schemes that may be used to support HeNB positioning and HeNB configuring in a location server. The first scheme may also be referred to as an LPPa solution. The second scheme may also be referred to as a Mobile Originated Location Request (MO-LR) solution. The third scheme may also be referred to as a SUPL solution. The fourth scheme may also be referred to as an Operation & Maintenance (O&M) solution. HeNB positioning and HeNB configuring in a location server may also be supported based on other schemes.

TABLE 1

| Scheme | Description |
| --- | --- |
| First Scheme (LPPa) | Use LPP to support HeNB positioning, and Use LPPa to transport LPP messages between a HeNB and an E-SMLC and to configure the HeNB in the E-SMLC. |
| Second Scheme (MO-LR) | Add embedded UE functionality to a HeNB, and Use control plane MO-LR to configure and locate the HeNB with an E-SMLC. |
| Third Scheme (SUPL) | Add embedded UE functionality to a HeNB, Use SUPL MO-LR to configure and locate the HeNB with an SLP, and Use SUPL Mobile Terminated Location Request (MT-LR) to locate the HeNB at SLP instigation. |
| Fourth Scheme (O&M) | Use O&M to configure a HeNB in an SLP or E-SMLC, and Use SUPL or control plane MO-LR to locate the HeNB. |

In the first scheme, HeNB positioning and HeNB configuring in a location server may be supported using LPP and LPPa. Conventionally, a UE accessing an LTE network, may exchange (e.g., send and/or receive) LPP messages with a location server (e.g., E-SMLC) to locate the UE. A HeNB may simply forward the LPP messages exchanged between the UE and the location server. The HeNB would be unaware of the LPP messages since these messages appear to the HeNB as higher layer signaling information for the UE and the network. In the first scheme, LPP may be extended to support positioning of the HeNB, which may act like a UE with respect to LPP positioning methods.

Figure 2:
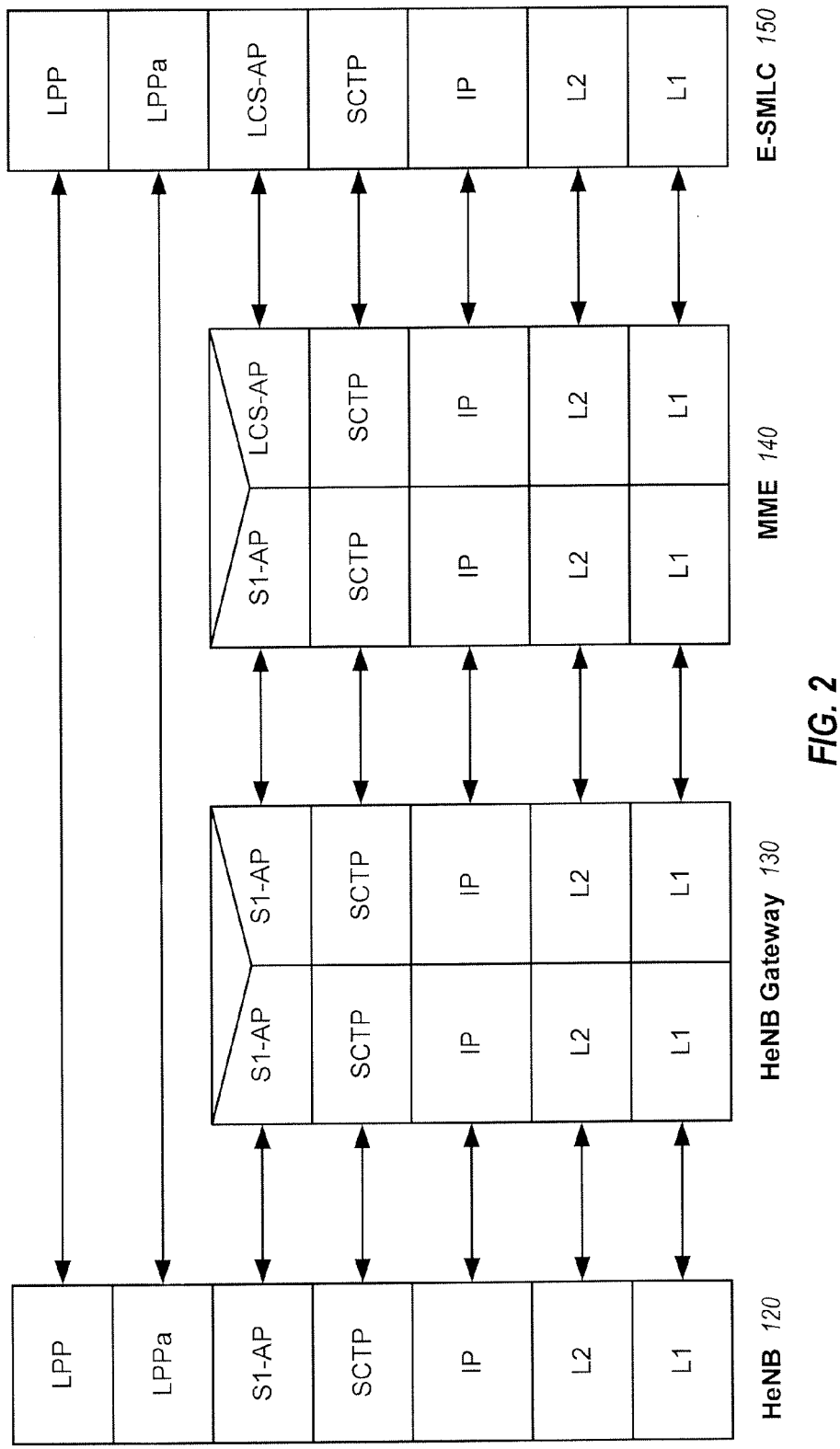
FIG. 2 shows protocol stacks at various network entities for a first scheme for configuring a HeNB in a location server and locating the HeNB.

FIG. 2 shows exemplary protocol stacks at HeNB 120, HeNB Gateway 130, MME 140, and E-SMLC 150 for the first scheme. HeNB 120 and E-SMLC 150 may communicate end-to-end via LPP, which may reside at the top of the protocol stacks for HeNB 120 and E-SMLC 150. LPP may reside over LPPa at HeNB 120 and E-SMLC 150. The protocol stacks between HeNB 120 and HeNB Gateway 130, and also the protocol stacks between HeNB Gateway 130 and MME 140, may include S1 Application Protocol (S1-AP) described in 3GPP TS 36.413, Stream Control Transmission Protocol (SCTP), IP, Layer 2 (L2), and Layer 1 (L1). The protocol stacks between MME 140 and E-SMLC 150 may include Location Services Application Protocol (LCS-AP) described in 3GPP TS 29.171, SCTP, IP, Layer 2, and Layer 1. The protocol stack in FIG. 2 may also apply when HeNB Gateway 130 is not present if the corresponding protocols in HeNB 120 and MME 140 are linked (e.g., with a link between the pair of SCTP protocol levels in the case of SCTP).

As shown in FIG. 2, LPP over LPPa may be added to the protocol stack of HeNB 120 to enable HeNB 120 to interact with E-SMLC 150 for location of HeNB 120. LPP over LPPa may also be added to the protocol stack of E-SMLC 150 to enable E-SMLC 150 to support location for HeNB 120. HeNB 120 and E-SMLC 150 may communicate LPP messages for positioning of HeNB 120 and/or configuring of HeNB 120 in E-SMLC 150. The LPP messages may be transported via LPPa messages. LPPa may enable an eNodeB to send ECID measurements for a UE, which is accessing the eNodeB, to an E-SMLC for positioning of the UE. LPPa may also enable an eNodeB to send information related to OTDOA positioning support (e.g., transmission and timing information for cells supported by the eNodeB) to an E-SMLC for use in later OTDOA positioning of a UE accessing or nearby to the eNodeB. LPPa may support these same functions for HeNB 120, e.g., if HeNB 120 and preferably the HeNB location have been configured in E-SMLC 150.

In one design, new LPPa messages may be defined to transport LPP messages between a HeNB and a location server (e.g., an E-SMLC). Table 2 lists a set of LPPa messages that may be defined to transport LPP messages between a HeNB and a location server, in accordance with one design. The LPPa messages in Table 2 are not associated with any UE and are referred to as non-UE associated messages. The HeNB Configuration Request message and the HeNB Configuration Response message may be used to configure the HeNB in the location server. The Uplink HeNB Location Transport message and the Downlink HeNB Location Transport message may be used for positioning of the HeNB. In Table 2, "(M)" denotes a mandatory item, and "(O)" denotes an optional item. In one design, new positioning information not supported in LPP may be added to LPPa in order to reduce impact to LPP.

TABLE 2

LPPa Messages

| LPPa Message | Items to Include/Transport in LPPa Message |
| --- | --- |
| HeNB Configuration Request | Tracking area code (TAC) for a HeNB (M), and One or more LPP messages to provide HeNB LPP capabilities and HeNB location information (O). |
| HeNB Configuration Response | One or more LPP/LPPe messages to provide E-SMLC LPP capabilities (O). |
| Uplink HeNB Location Transport | Quality-of-positioning (QoP) for requested HeNB location (O), and One or more LPP messages (O). |
| Downlink HeNB Location Transport | HeNB location coordinates and uncertainty (O), and One or more LPP messages (O). |

Figure 3:
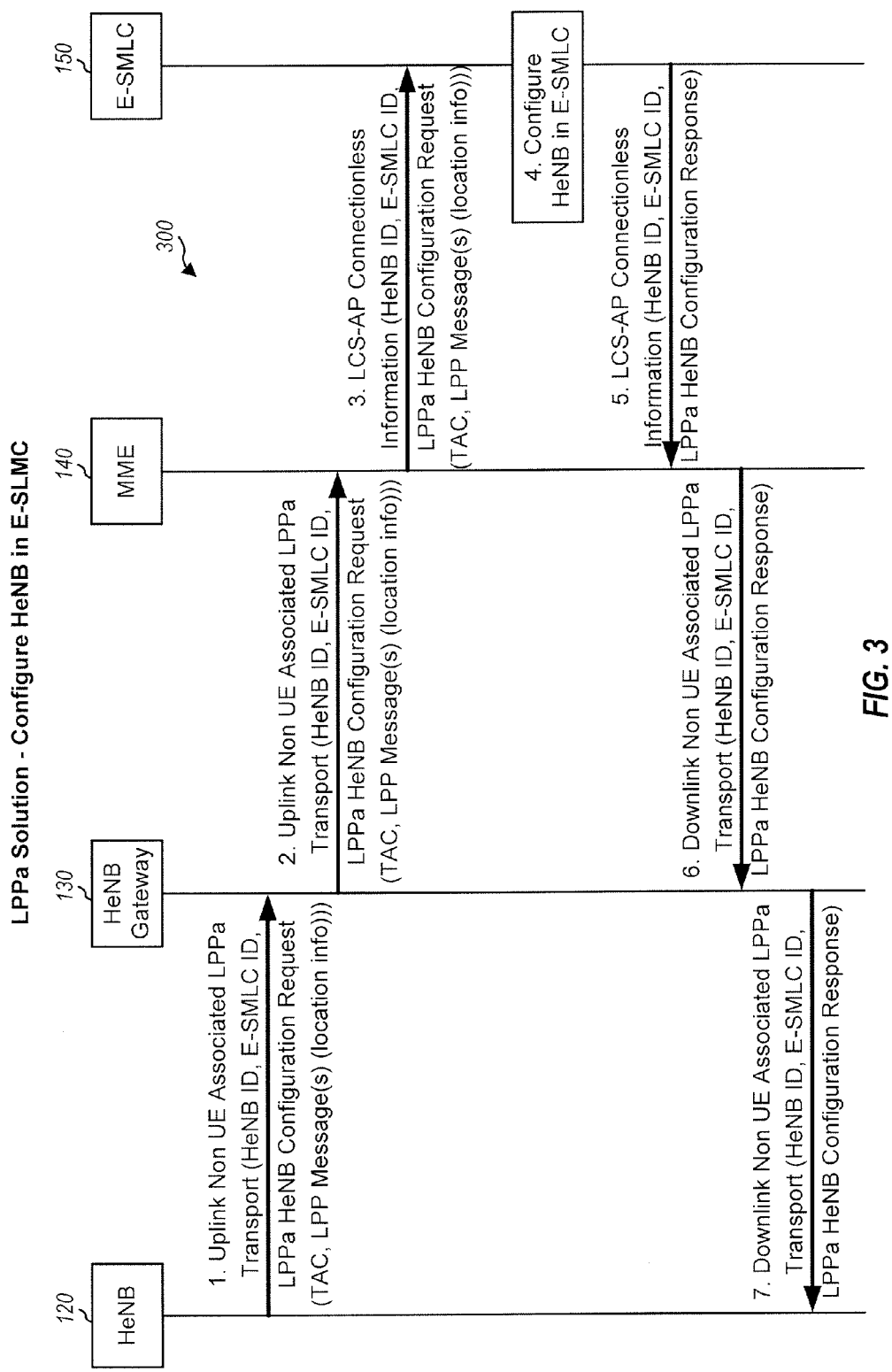
FIGS. 3, 4 and 5 show message flows for configuring and locating a HeNB based on the first scheme.

FIG. 3 shows a design of a message flow 300 for configuring HeNB 120 in E-SMLC 150 based on the first scheme. HeNB 120 may initiate configuring itself in E-SMLC 150 as part of initialization or following initialization. E-SMLC 150 may not know the presence or identity of HeNB 120 and may not have any information for HeNB 120. Hence, a purpose of configuring HeNB 120 in E-SMLC 150 is to provide E-SMLC 150 with pertinent information for HeNB 120. This information may be used by E-SMLC 150 to support location of UEs accessing HeNB 120. Such pertinent information may include a unique identity (ID) of HeNB 120 (HeNB ID), location of HeNB 120, etc. The pertinent information may be comparable to the information normally configured in an E-SMLC for a macro eNB or a pico eNB by O&M. O&M is a function performed by one or more network management entities such as HeMS 134.

HeNB 120 may send an Uplink Non UE Associated LPPa Transport message to HeNB Gateway 130 (step 1). The LPPa transport message is part of an E-UTRAN S1 Application Protocol (S1-AP) and is used to transport an LPPa message. The LPPa transport message may include a HeNB ID of HeNB 120, an E-SMLC ID of E-SMLC 150, and an LPPa HeNB Configuration Request message. The HeNB ID and the E-SMLC ID may have been configured in HeNB 120, e.g., by HeMS 134 when HeNB 120 started initialization. The LPPa HeNB Configuration Request message may include a tracking area code for HeNB 120 and one or more LPP messages. An LPP message may include the positioning capabilities for HeNB 120. An LPP message may include location information for HeNB 120, e.g., may contain an identity of a cell served by HeNB 120, identities of neighboring cells detected by HeNB 120, measurements of GNSS satellites, base stations, and/or HeNBs nearby to HeNB 120, the location of HeNB 120 if previously obtained by or provided to HeNB 120, etc. If the location of HeNB 120 needs to be included in step 1, then HeNB 120 may use the procedure described below for FIG. 4 to obtain this location prior to performing step 1 in FIG. 3.

HeNB Gateway 130 may receive the Uplink Non UE Associated LPPa Transport message from HeNB 120 and may forward this message to MME 140 (step 2). HeNB Gateway 130 may determine MME 140 from the E-SMLC ID received in step 1, e.g., based on E-SMLCs supported by different MMEs having been configured in HeNB Gateway 130. MME 140 may forward the content of the LPPa transport message in an LCS-AP Connectionless Information message to E-SMLC 150 (step 3). MME 140 may determine E-SMLC 150 from the E-SMLC ID sent by HeNB 120. E-SMLC 150 may receive the message from MME 140 and may extract the content of the message. E-SMLC 150 may recognize that HeNB 120 initiated configuring based on the LPPa HeNB Configuration Request message. E-SMLC 150 may then configure HeNB 120 in its database, e.g., by storing the HeNB ID, the TAC, the positioning capabilities of HeNB 120 if received in step 3, the identity of MME 140, and the location of HeNB 120 as provided in or determined from the location information sent by HeNB 120 (step 4). If the location of HeNB 120 is not provided or cannot be determined by E-SMLC 150 from the location information sent by HeNB 120 in step 1 or if the provided or determined location is not sufficiently accurate, then E-SMLC 150 may instigate a location procedure to obtain the location of HeNB 120 as described below for FIG. 5. This procedure may be instigated before or after E-SMLC 150 instigates step 5 in FIG. 3.

E-SMLC 150 may then send to MME 140 an LCS-AP Connectionless Information message, which may include the HeNB ID, the E-SMLC ID, and an LPPa HeNB Configuration Response message (step 5). MME 140 may receive the LCS-AP Connectionless Information message from E-SMLC 150 and may forward the content of this message in a Downlink Non UE Associated LPPa Transport message to HeNB Gateway 130 (step 6). MME 140 may determine HeNB Gateway 130 from the HeNB ID for HeNB 120 received in step 5, e.g., if MME 140 earlier received the HeNB ID from HeNB Gateway 130 when HeNB 120 was initializing and stored the HeNB ID and its association with HeNB Gateway 130. HeNB Gateway 130 may receive the Downlink Non UE Associated LPPa Transport message from MME 140 and may forward this message to HeNB 120 (step 7). HeNB Gateway 130 may make use of the HeNB ID received in step 6 to determine HeNB 120. HeNB 120 may determine that it is configured in E-SMLC 150 based on the received message.

Figure 4:
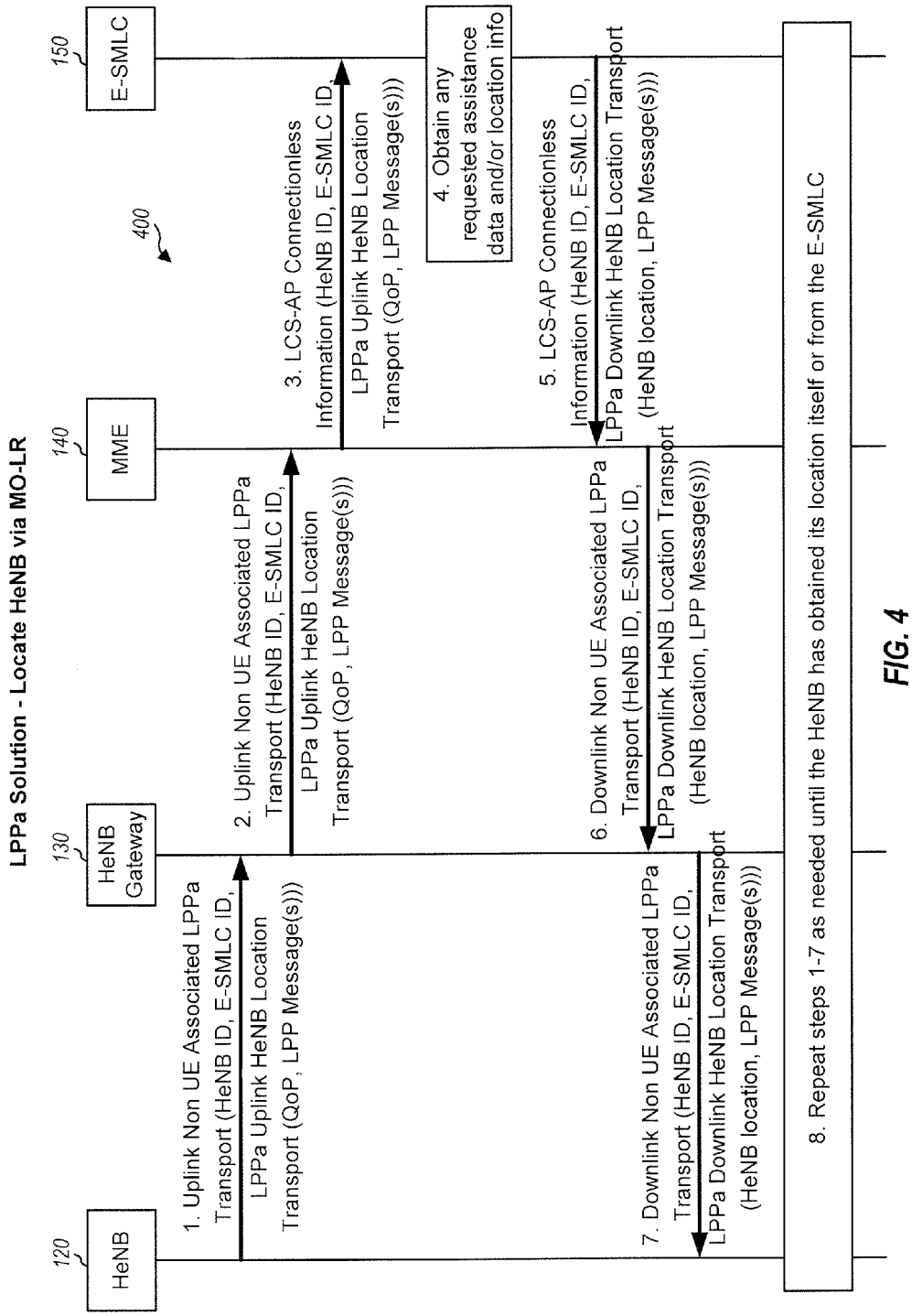

FIG. 4 shows a design of a message flow 400 for supporting location for HeNB 120 via MO-LR for the first scheme. HeNB 120 may initiate an MO-LR location session to obtain its location during initialization or following initialization. For example, HeNB 120 may initiate an MO-LR location session during initialization if HeNB 120 or HeMS 134 needs an accurate location of HeNB 120 in order to verify that HeNB 120 is licensed to operate at its current location.

HeNB 120 may send to HeNB Gateway 130 an Uplink Non UE Associated LPPa Transport message that may include the HeNB ID of HeNB 120, the E-SMLC ID of E-SMLC 150, and an LPPa Uplink HeNB Location Transport message (step 1). The HeNB ID and the E-SMLC ID may have been configured in HeNB 120, e.g., by HeMS 134 when HeNB started initialization. The LPPa Uplink HeNB Location Transport message may include one or more LPP messages and/or other information such as the requested QoP for HeNB location. An LPP message may provide positioning capabilities of HeNB 120, request for assistance data for A-GNSS or another positioning method (e.g., OTDOA), provide measurements made by HeNB 120, provide a location estimate available to HeNB 120, and/or perform other functions. The positioning capabilities of HeNB 120 may include (i) the positioning methods (e.g., A-GNSS, OTDOA, etc.) supported by HeNB 120 and (ii) the particular GNSS systems and GNSS signals supported by HeNB 120, if A-GNSS is supported.

HeNB Gateway 130 may receive the Uplink Non UE Associated LPPa Transport message from HeNB 120 and may forward this message to MME 140 (step 2). HeNB Gateway 130 may determine MME 140 from the E-SMLC ID received in step 1. MME 140 may forward the content of the LPPa transport message in an LCS-AP Connectionless Information message to E-SMLC 150 (step 3). MME 140 may determine E-SMLC 150 from the E-SMLC ID sent by HeNB 120. E-SMLC 150 may support location for HeNB 120 based on the LPP message(s) sent by HeNB 120 (step 4). For example, E-SMLC 150 may store the positioning capabilities of HeNB 120, provide assistance data if requested, compute a location estimate based on measurements sent by HeNB 120, etc.

E-SMLC 150 may then send to MME 140 an LCS-AP Connectionless Information message, which may include the HeNB ID, the E-SMLC ID, and an LPPa Downlink HeNB Location Transport message (step 5). The LPPa Downlink HeNB Location Transport message may include a location estimate for HeNB 120 and/or one or more LPP messages. An LPP message may provide positioning capabilities of E-SMLC 150, provide assistance data for A-GNSS or other positioning methods if requested by HeNB 120 in step 1, request measurements or a location estimate from HeNB 120, and/or perform other functions. MME 140 may receive the LCS-AP Connectionless Information message from E-SMLC 150 and may forward the content of this message in a Downlink Non UE Associated LPPa Transport message to HeNB Gateway 130 (step 6). MME 140 may determine HeNB Gateway 130 from the HeNB ID for HeNB 120 received in step 5. HeNB Gateway 130 may receive the Downlink Non UE Associated LPPa Transport message from MME 140 and may forward this message to HeNB 120 (step 7). HeNB Gateway 130 may determine HeNB 120 based on the HeNB ID received in step 6.

HeNB 120 may then determine its own location using assistance data received from E-SMLC 150 in step 7 as well as measurements of GNSS satellites or nearby base stations. Alternatively, HeNB 120 may obtain its location from E-SMLC 150 in step 7. In either case, the procedure in FIG. 4 may terminate. Alternatively (e.g., if HeNB 120 is unable to determine or receive its location following step 7), steps 1 to 7 may be repeated as many times as needed until HeNB 120 can obtain its location by itself or from E-SMLC 150 (step 8). For each sequence of steps 1 to 7, HeNB 120 may send zero or more LPP messages to E-SMLC 150 containing information (e.g., measurements or a location estimate) requested by E-SMLC 150 during the previous sequence of steps 1 to 7 as well as additional information instigated by HeNB 120 (e.g., a request for more assistance data), and E-SMLC 150 may send zero or more LPP messages to HeNB 120. Each LPP message may include any information useful to support location for HeNB 120.

Figure 5:
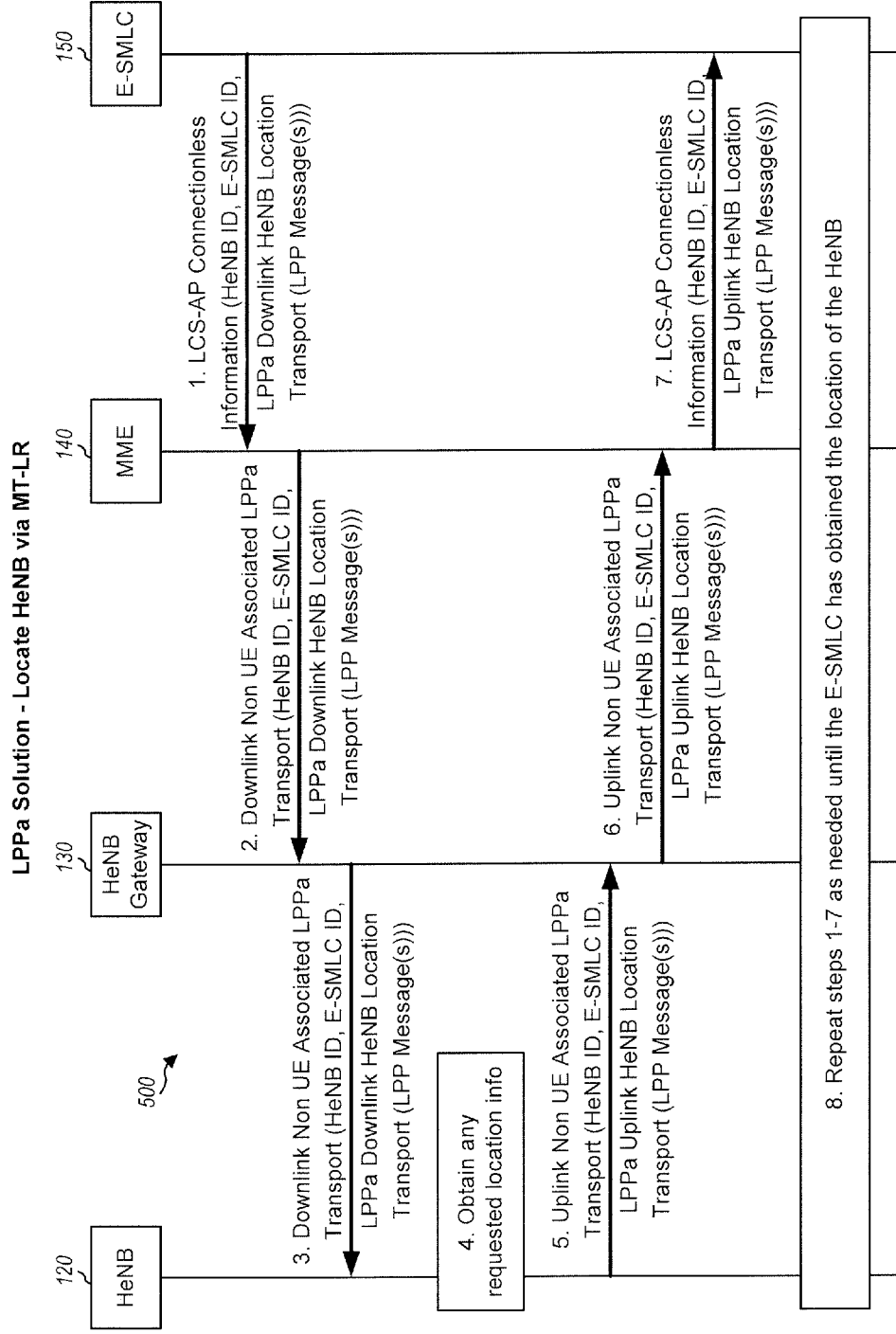

FIG. 5 shows a design of a message flow 500 for supporting location for HeNB 120 via MT-LR for the first scheme. E-SMLC 150 may initiate an MT-LR location session to obtain the location of HeNB 120 during or after initialization of HeNB 120. For example, E-SMLC 150 may initiate an MT-LR location session, when triggered by HeNB configuration, if an insufficiently accurate location estimate for HeNB 120 is provided or if a positioning method requires location measurements for multiple HeNBs.

E-SMLC 150 may send to MME 140 an LCS-AP Connectionless Information message that may include the HeNB ID of HeNB 120, the E-SMLC ID of E-SMLC 150, and an LPPa Downlink HeNB Location Transport message (step 1). E-SMLC 150 may determine MME 140 from configuration information previously stored for HeNB 120, e.g., using the procedure of FIG. 3. The LPPa Downlink HeNB Location Transport message may include one or more LPP messages and/or other information. An LPP message may provide positioning capabilities of E-SMLC 150, request for positioning capabilities of HeNB 120, request for measurements and/or location from HeNB 120, provide assistance data for A-GNSS or other positioning methods, and/or perform other functions. The positioning capabilities of E-SMLC 150 may include (i) the positioning methods (e.g., A-GNSS, OTDOA, etc.) supported by E-SMLC 150 and (ii) the particular GNSS systems and GNSS signals supported by E-SMLC 150, if A-GNSS is supported.

MME 140 may receive the LCS-AP Connectionless Information message from E-SMLC 150 and may forward the content of this message in a Downlink Non UE Associated LPPa Transport message to HeNB Gateway 130 (step 2). MME 140 may determine HeNB Gateway 130 from the HeNB ID for HeNB 120 received in step 1. HeNB Gateway 130 may receive the Downlink Non UE Associated LPPa Transport message from MME 140 and may forward this message to HeNB 120 (step 3). HeNB Gateway 130 may determine HeNB 120 based on the HeNB ID received in step 2.

HeNB 120 may perform functions based on the LPP message(s) received from E-SMLC 150 (step 4). For example, HeNB 120 may obtain location measurements and/or determine a location estimate if requested by E-SMLC 150, store assistance data for A-GNSS or other positioning methods if sent, store the positioning capabilities of E-SMLC 150, etc. HeNB 120 may then send to HeNB Gateway 130 an Uplink Non UE Associated LPPa Transport message that may include the HeNB ID of HeNB 120, the E-SMLC ID of E-SMLC 150, and an LPPa Uplink HeNB Location Transport message that may include one or more LPP messages (step 5). An LPP message may provide positioning capabilities of HeNB 120 (e.g., if requested by E-SMLC 150 in step 1), provide measurements and/or a location estimate (e.g., if requested by E-SMLC 150 in step 1), request for assistance data for A-GNSS or other positioning methods, and/or perform other functions.

HeNB Gateway 130 may receive the Uplink Non UE Associated LPPa Transport message from HeNB 120 and may forward this message to MME 140 (step 6). HeNB Gateway 130 may determine MME 140 from the E-SMLC ID received in step 5. MME 140 may forward the content of the LPPa transport message in an LCS-AP Connectionless Information message to E-SMLC 150 (step 7). MME 140 may determine E-SMLC 150 from the E-SMLC ID sent by HeNB 120. E-SMLC 150 may perform functions based on the LPP message(s) received from HeNB 120. For example, E-SMLC 150 may compute a location estimate for HeNB 120 based on measurements received from HeNB 120, determine a location estimate for HeNB 120 based on a location estimate received from HeNB 120, store a computed or determined location estimate in a local database to help support location for UEs (e.g., UE 110) that later access HeNB 120, provide the location estimate to another entity, obtain assistance data for A-GNSS or some other positioning method if requested by HeNB 120, etc.

If E-SMLC 150 computes or determines a location estimate of sufficient accuracy for HeNB 120 following step 7, the procedure may terminate. Otherwise, steps 1 to 7 may be repeated as many times as needed until E-SMLC 150 can compute or determine the location of HeNB 120 (step 8). For each sequence of steps 1 to 7, E-SMLC 150 may send zero or more LPP messages to HeNB 120, and HeNB 120 may send zero or more LPP messages to E-SMLC 150. Each LPP message may include any information useful to support location for HeNB 120.

The procedures in FIGS. 3, 4 and 5 may also apply when HeNB 120 is connected directly to MME 140 (e.g., via Security Gateway 124) and HeNB Gateway 130 is absent. In this case, pairs of steps previously associated with HeNB Gateway 130 may be condensed into a single step associated with HeNB 120 and MME 140. In particular, steps 1 and 2 and steps 6 and 7 in FIGS. 3 and 4 and steps 2 and 3 and steps 5 and 6 in FIG. 7 may each be condensed into a single step.

In the second scheme, HeNB positioning and HeNB configuring in a location server may be supported with MO-LR using an embedded UE in a HeNB. The embedded UE may be known to some network entities. For example, a location server may know the identity of the embedded UE and may support location for the HeNB with this knowledge. The embedded UE may be transparent to other network entities, which may operate in the normal manner without being impacted by the embedded UE.

In general, a HeNB may include one or more embedded UEs. Each embedded UE may support a subset of the normal functions of a UE (e.g., attach to and detach from a network and functions related to location) and may be associated with a unique UE ID. The unique UE ID may be an International Mobile Subscriber Identity (IMSI), a Mobile Station International Subscriber Directory Number (MSISDN), an International Mobile Station Equipment Identity (IMEI), or some other ID. In one design, an embedded UE may be known to a location server (e.g., E-SMLC 150). For example, UE IDs within a predetermined range of values and/or having certain unique digits may be assigned to embedded UEs for HeNBs. The location server may support location for a HeNB with the knowledge that, due to the embedded UE, location is for a HeNB and not a UE. In one design, an embedded UE may be transparent to an MME, which may treat the embedded UE like any other UE. In one design, an embedded UE may be known to a Home Subscriber Server (HSS) and may be allowed to perform limited operations such as, e.g., attachment to an Evolved Packet Core (EPC) network, MO-LR, etc.

In one design, a HeNB may include only one embedded UE and may be configured in only one location server (e.g., one E-SMLC) based on this embedded UE. This design may be used when a HeNB connects to an MME (directly or via a HeNB Gateway) that is connected to only one E-SMLC. In another design, the HeNB may include multiple (N) embedded UEs with different UE IDs and may be configured in up to N location servers (e.g., N different E-SMLCs). Each embedded UE may be associated with one location server. For example, different UE ID ranges may be associated with different location servers. The HeNB may perform N MO-LR transactions for its N embedded UEs to separately configure itself as one embedded UE in each location server. This design may be used if an MME to which a HeNB is connected (directly or via a HeNB Gateway) is connected to multiple E-SMLCs.

Figure 6:
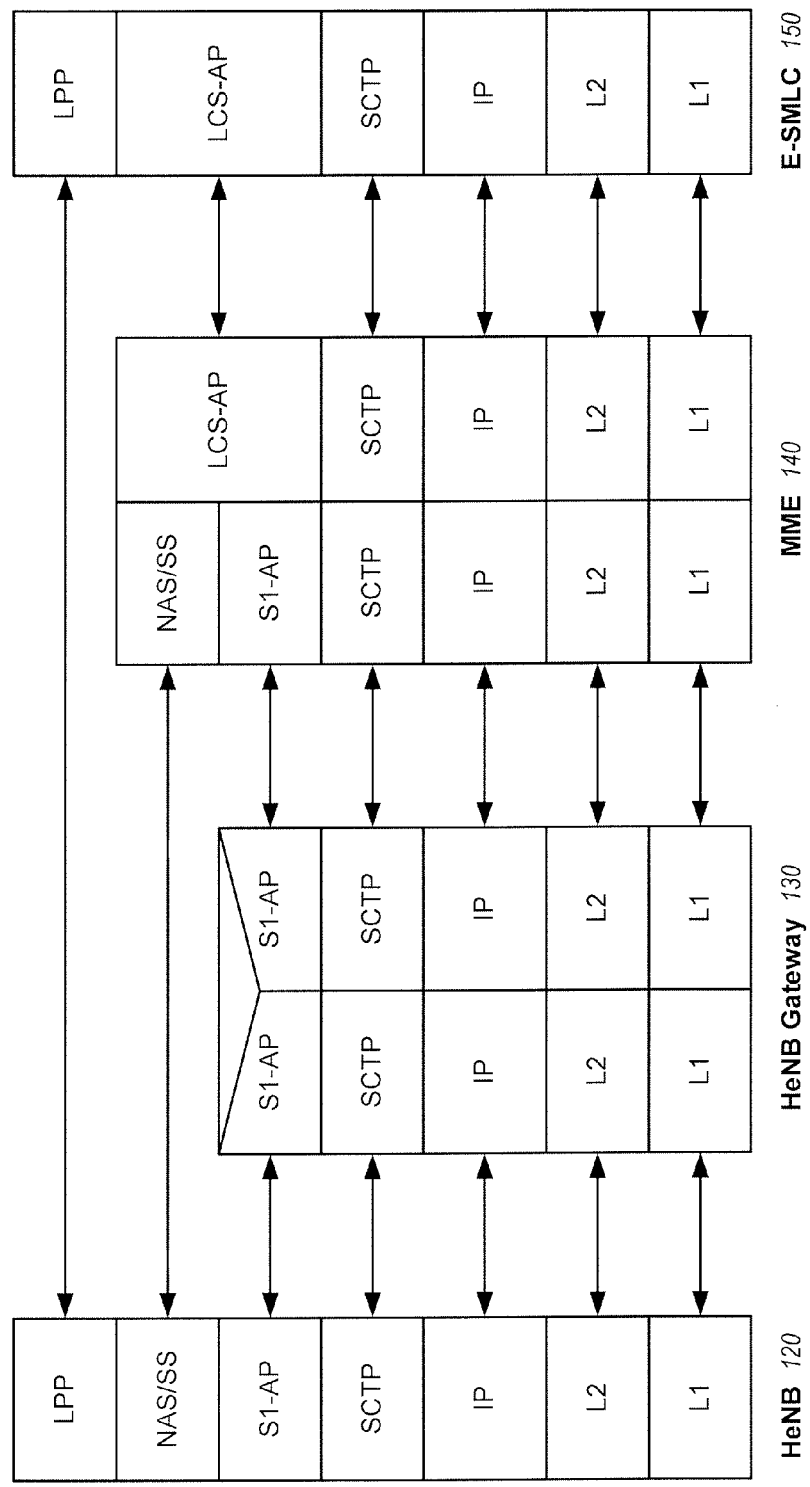
FIG. 6 shows protocol stacks at various network entities for a second scheme for configuring a HeNB in a location server and locating the HeNB.

FIG. 6 shows exemplary protocol stacks at HeNB 120, HeNB Gateway 130, MME 140, and E-SMLC 150 for the second scheme. HeNB 120 and E-SMLC 150 may communicate end-to-end via LPP, which may reside at the top of the protocol stacks for HeNB 120 and E-SMLC 150. HeNB 120 and MME 140 may communicate messages via Non-Access Stratum (NAS) and Supplementary Service (SS). NAS supports downlink and uplink generic NAS transport of LPP messages and is described in 3GPP TS 24.301 and TS 24.171. SS supports MO-LR request and response and is described in 3GPP TS 24.171. The protocol stacks between HeNB 120 and HeNB Gateway 130, and also the protocol stacks between HeNB Gateway 130 and MME 140, may include S1-AP, SCTP, IP, Layer 2, and Layer 1. The protocol stacks between MME 140 and E-SMLC 150 may include LCS-AP, SCTP, IP, Layer 2, and Layer 1. The protocol stack in FIG. 6 may also apply when HeNB Gateway 130 is not present if the corresponding protocols in HeNB 120 and MME 140 are linked (e.g., with a link between the pair of SCTP protocol levels in the case of SCTP).

Figure 7:
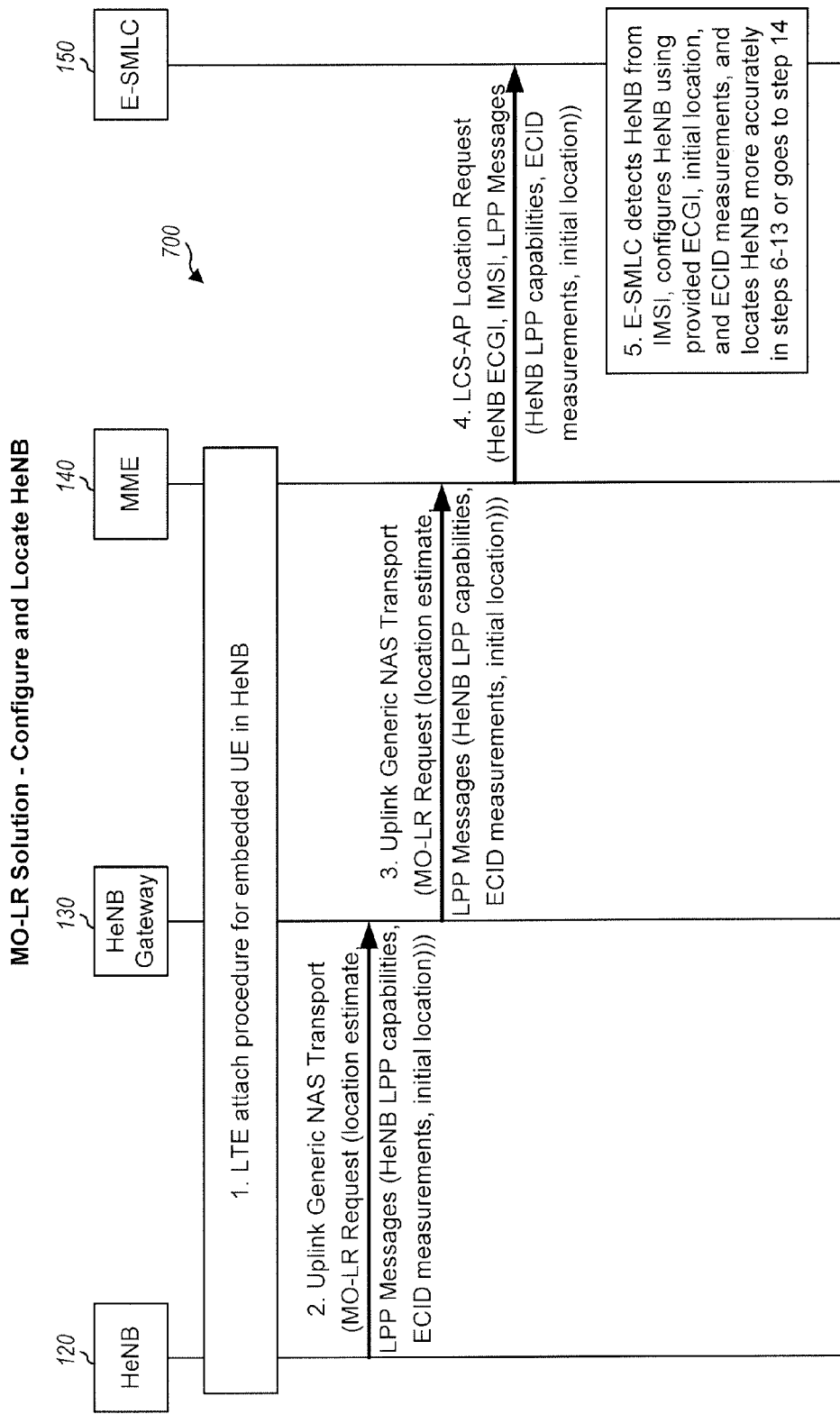
FIG. 7 shows a message flow for configuring and locating a HeNB based on the second scheme.
Figure 7:
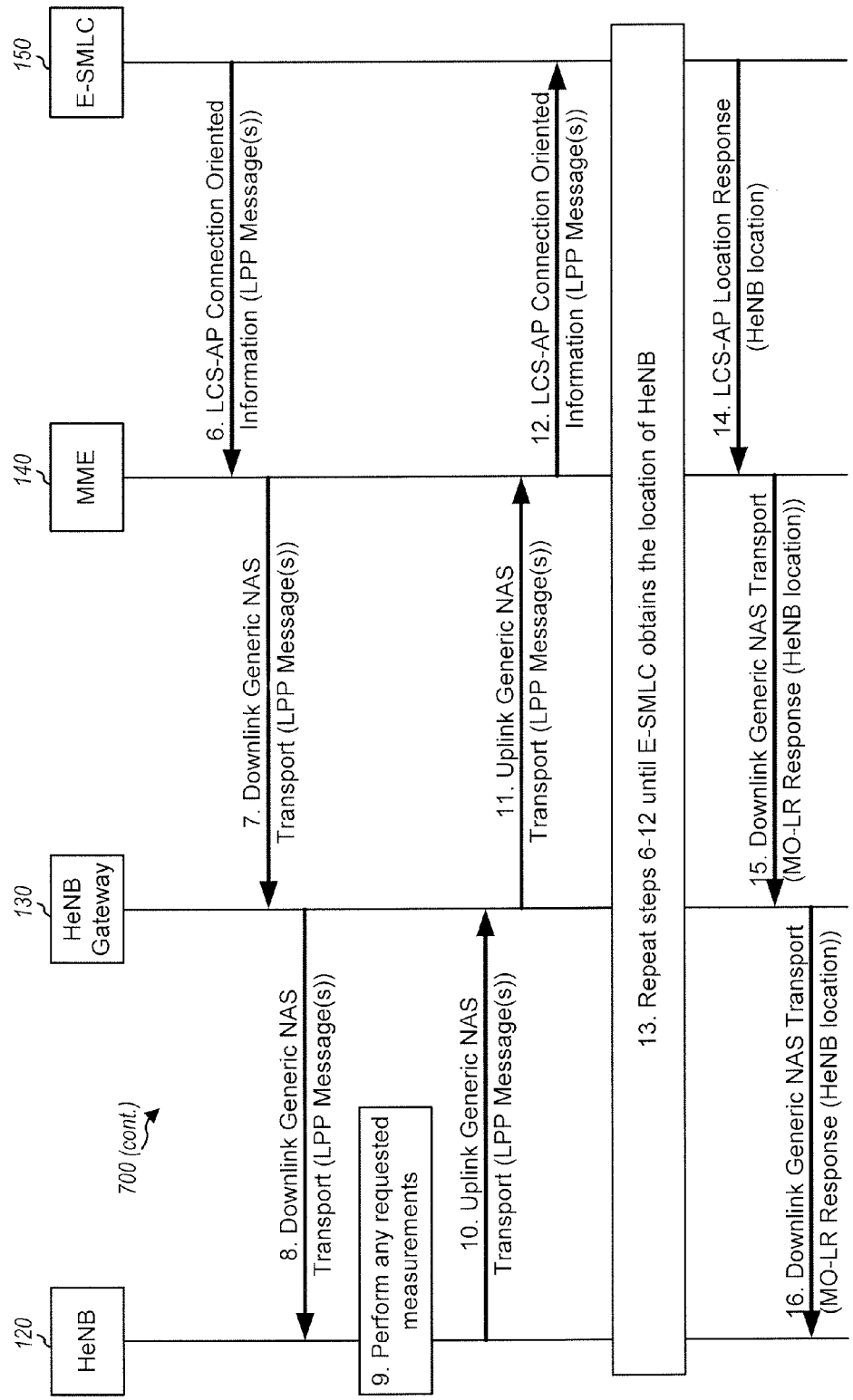

FIG. 7 shows a design of a message flow 700 to configure and locate HeNB 120 via MO-LR with HeNB 120 having an embedded UE for the second scheme. Initially, HeNB 120 may perform an attach procedure with MME 140 (e.g., in the same manner as a UE accessing HeNB 120 would perform an attach procedure) based on an embedded UE ID of the embedded UE assigned to HeNB 120 (step 1). From the perspective of MME 140, the attach procedure may appear to be a normal attach for a UE accessing HeNB 120. MME 140 may or may not become aware of the presence of HeNB 120 due to the attachment but may treat HeNB 120 as a UE based on the embedded UE ID and the use of the normal UE attach procedure by HeNB 120. MME 140 may obtain pertinent information for HeNB 120 via the attachment including the embedded UE ID. MME 140 may obtain other information for HeNB 120 from an HSS, which may provide MME 140 with the services allowed for HeNB 120 (e.g., a subset of services allowed for a normal UE and including the ability to perform an MO-LR).

HeNB 120 may thereafter initiate an MO-LR location session to configure itself in E-SMLC 150 and/or to determine its location. This MO-LR location session may follow an MO-LR location session used by a normal UE. HeNB 120 may send to HeNB Gateway 130 an Uplink Generic NAS Transport message that may include an MO-LR Request message (step 2). The MO-LR Request message may include one or more LPP messages and/or other information such as a request for a location estimate for HeNB 120. An LPP message may provide positioning capabilities of HeNB 120, request assistance data for A-GNSS or other positioning methods, provide measurements (e.g., for ECID) made by HeNB 120, provide a location estimate available to HeNB 120, and/or perform other functions.

HeNB Gateway 130 may receive the Uplink Generic NAS Transport message from HeNB 120 and may forward this message to MME 140 (step 3). MME 140 may receive NAS transport message and recognize the MO-LR Request message from HeNB 120. MME 140 may then send to E-SMLC 150 an LCS-AP Location Request message that may include an E-UTRAN Cell Global Identifier (ECGI) of a cell served by HeNB 120, the embedded UE ID (e.g., an IMSI and/or an IMEI) of HeNB 120, and the LPP messages sent by HeNB 120 (step 4). Although MME 140 may not be aware that the MO-LR request is for a HeNB, MME 140 may include the UE ID in step 4 to assist location for a normal UE.

E-SMLC 150 may receive the LCS-AP Location Request message from MME 140 and may detect HeNB 120 based on the embedded UE ID (step 5). E-SMLC 150 may configure HeNB 120 using (i) the ECGI provided by MME 140 and (ii) the initial location and/or measurements provided by HeNB 120. E-SMLC 150 may then attempt to locate HeNB 120 more accurately by performing steps 6 to 13 or may terminate the MO-LR location session by jumping to step 14.

To locate HeNB 120, E-SMLC 150 may send to MME 140 an LCS-AP Connection Oriented Information message, which may include one or more LPP messages (step 6). An LPP message from E-SMLC 150 may include assistance data for A-GNSS or some other positioning method, a request for measurements, etc. MME 140 may receive the LCS-AP Connection Oriented Information message from E-SMLC 150 and may forward the content of this message in a Downlink Generic NAS Transport message to HeNB Gateway 130 (step 7). HeNB Gateway 130 may receive the Downlink Generic NAS Transport message from MME 140 and may forward this message to HeNB 120 (step 8).

HeNB 120 may be aware that the Downlink Generic NAS Transport message received in step 8 is intended for HeNB 120, and not for a UE accessing HeNB 120 (e.g., UE 110), based on session related information carried by the S1-AP protocol (e.g., an eNodeB UE S1AP ID parameter). HeNB 120 may perform functions based on the LPP messages sent by E-SMLC 150 (step 9). For example, HeNB 120 may store and make use of any assistance data received from E-SMLC 150 and may make measurements as requested by E-SMLC 150. HeNB 120 may then send to HeNB Gateway 130 an Uplink Generic NAS Transport message, which may include one or more LPP messages (step 10). An LPP message from HeNB 120 may include measurements requested by E-SMLC 150, a request for assistance data for A-GNSS or other positioning methods, etc. HeNB Gateway 130 may receive the Uplink Generic NAS Transport message from HeNB 120 and may forward this message to MME 140 (step 11). MME 140 may receive the Uplink Generic NAS Transport message from HeNB Gateway 130 and may forward the content of this message in an LCS-AP Connection Oriented Information message to E-SMLC 150 (step 12). E-SMLC 150 may perform functions based on the LPP message(s) received from HeNB 120. For example, E-SMLC 150 may compute a location estimate for HeNB 120 based on measurements received from HeNB 120.

Steps 6 to 12 may be repeated as many times as needed until E-SMLC 150 can obtain the location of HeNB 120 (step 13). After step 13 (or step 5 if steps 6 to 13 are not performed), E-SMLC 150 may store the location of HeNB 120 as part of HeNB 120 configuration information and may send to MME 140 an LCS-AP Location Response message, which may include the location of HeNB 120 (step 14). MME 140 may receive LCS-AP Location Response message from E-SMLC 150 and may send a Downlink Generic NAS Transport message to HeNB Gateway 130 (step 15). The NAS Transport message may include an MO-LR Response message, which may include the location of HeNB 120. HeNB Gateway 130 may forward the Downlink Generic NAS Transport message to HeNB 120 (step 16).

The procedure in FIG. 7 may enable HeNB 120 to configure information in one E-SMLC, e.g., E-SMLC 150. To configure information in another E-SMLC, HeNB 120 may perform the procedure in FIG. 7 but using a different embedded UE with a different embedded UE ID. After performing the attach in step 1 based on a different embedded UE, MME 140 may perceive the remaining steps 2 to 16 as being associated with the different UE. MME 140 may then be configured (e.g., by O&M) to select a different E-SMLC for step 4, which may cause HeNB 120 to become configured in this different E-SMLC (e.g., in step 5). The selection of an E-SMLC by MME 140 for step 4 may be associated with the embedded UE ID. For example, K ranges or sets of embedded UE IDs may be configured in MME 140 as being associated with K different E-SMLCs. If HeNB 120 has N embedded UEs and MME 140 is connected to at least N different E-SMLCs, then HeNB 120 may invoke the procedure in FIG. 7 N times, once for each embedded UE, to configure information in each of the N E-SMLCs. This may be reliable as long as each embedded UE ID is configured in MME 140 to be associated with a different E-SMLC.

The procedure of FIG. 7 may also apply when HeNB 120 is connected directly to MME 140 (e.g., via Security Gateway 124), and HeNB Gateway 130 is absent. In this case, pairs of steps previously associated with HeNB Gateway 130 may be condensed into a single step associated with HeNB 120 and MME 140. In particular, steps 2 and 3, steps 7 and 8, steps 10 and 11, and steps 15 and 16 in FIG. 7 may each be condensed into a single step.

In the third scheme, HeNB positioning and HeNB configuring in a location server may be supported with SUPL using an embedded UE in a HeNB. SUPL is normally used to support location for UEs/SETs. The embedded UE may enable the HeNB to behave like a UE (or SET) to an SLP. Since SUPL employs user plane signaling, messages may be communicated between the HeNB and the SLP via network entities that do not need to be aware of the embedded UE. Hence, administration of the embedded UE in an HSS may be avoided. This is in contrast to the use of control plane signaling for MO-LR in the second scheme, which may impact certain network entities such as an MME or a HSS. The third scheme with SUPL may be applicable for wireless networks as well as wireline networks (e.g., subscriber cable or DSL access).

An embedded UE in a HeNB may be assigned a UE ID, which may be an MSISDN, an IMSI, etc. In one design, an SLP may recognize that a UE ID is for an embedded UE (and not for a normal UE) if the UE ID is within a predetermined range of values, e.g., with specific digit(s) being within a certain range. This design can avoid the need to configure the SLP with individual UE IDs of embedded UEs in HeNBs, which may save storage and configuration processing. Alternatively, information (e.g., UE IDs) for individual embedded UEs may be configured in the SLP.

In one design, a HeNB may invoke a SUPL MO-LR location session to perform self location using SUPL and RRLP or using SUPL and LPP/LPPe. For SUPL version 2.0 (SUPL 2.0), the HeNB may pretend that the embedded UE has wireless access (e.g., LTE access). For SUPL version 3.0 (SUPL 3.0), the HeNB do not need to pretend that the embedded UE has wireless access since wireline access (e.g., cable and DSL access) is also supported by SUPL 3.0.

Figure 8:
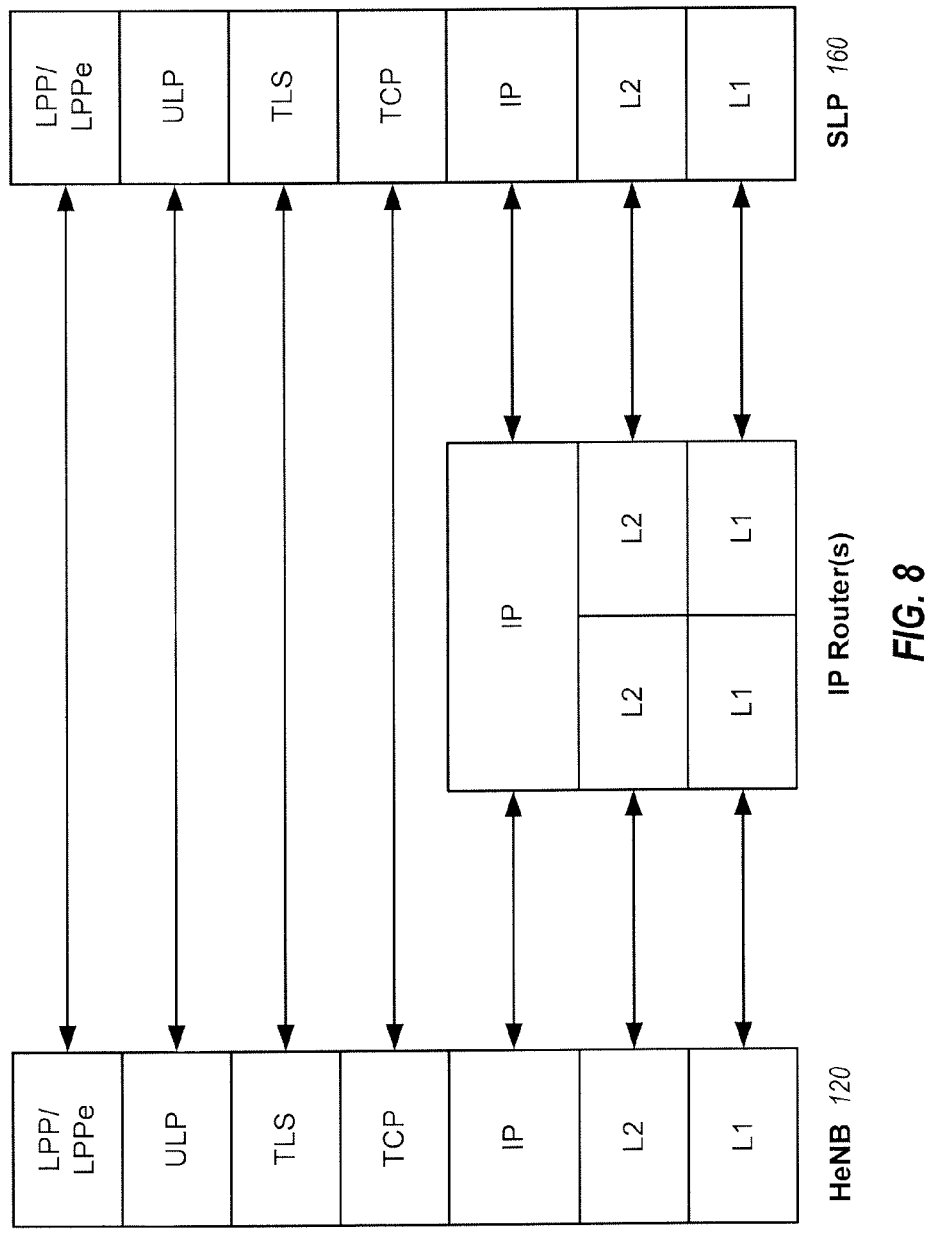
FIG. 8 shows protocol stacks at various network entities for a third scheme for configuring a HeNB in a location server and locating the HeNB.

FIG. 8 shows exemplary protocol stacks at HeNB 120, IP router(s), and SLP 160 for the third scheme. HeNB 120 and SLP 160 may communicate end-to-end via LPP/LPPe or RRLP (not shown in FIG. 8), which may reside at the top of the protocol stacks for HeNB 120 and SLP 160. HeNB 120 and SLP 160 may communicate messages between each other via LPP/LPPe, SUPL User Plane Location Protocol (ULP), Transport Layer Security (TLS), TCP, IP, Layer 2, and Layer 1. The protocol stacks between HeNB 120 and the IP router(s), and also the protocol stacks between the IP router(s) and SLP 160, may include IP, Layer 2, and Layer 1.

In the design shown in FIG. 8, HeNB 120 may connect to SLP 160 via local IP access, e.g., through a cable or DSL provider and via the Internet. SUPL can provide end-to-end security via TLS, so untrusted access by HeNB 120 would not compromise security. Alternatively, HeNB 120 may connect to SLP 160 via wireless network 100. HeNB 120 and SLP 160 may then communicate messages between each other (i) via HeNB Gateway 130, Serving Gateway 132, and PDN Gateway 142 in FIG. 1 or (ii) via Serving Gateway 132 and PDN Gateway 142. In either case, SLP 160 may authenticate HeNB 120 using SUPL Alternative Client Authentication (ACA), which may be simpler than authentication mechanisms such as Generic Bootstrapping Architecture and Device certificates applicable to FIG. 8.

Figure 9:
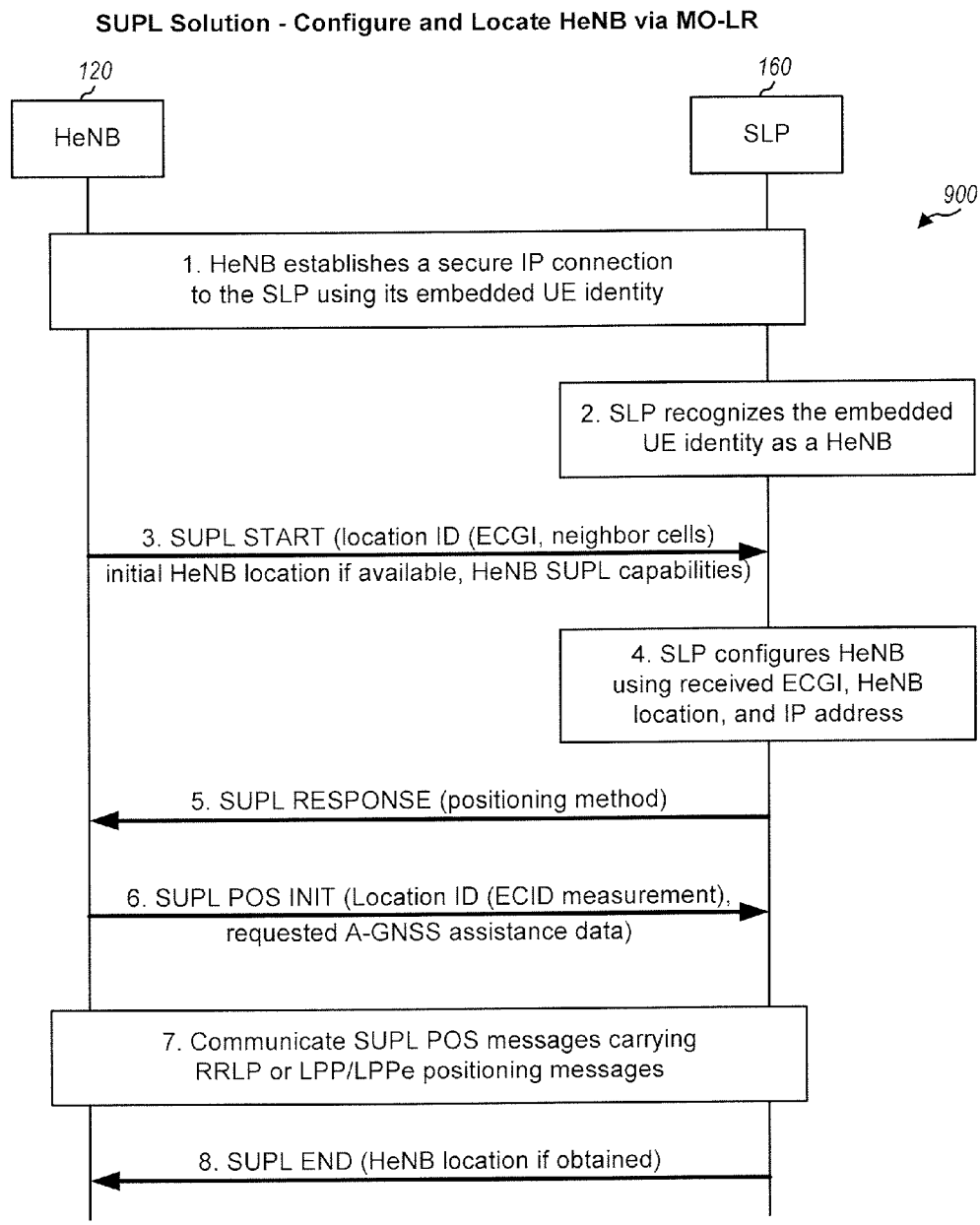
FIGS. 9 and 10 show message flows for configuring and locating a HeNB based on the third scheme.

FIG. 9 shows a design of a message flow 900 for locating and configuring HeNB 120 in SLP 160 via SUPL with HeNB 120 having an embedded UE for the third scheme. The embedded UE may be associated with a UE ID (e.g., an MSISDN or an IMSI), which may be interpreted by SLP 160 as being for a HeNB instead of a UE. The procedure in FIG. 9 may be invoked by HeNB 120 when HeNB 120 needs to obtain its location (e.g., during initialization to determine whether HeNB 120 is in a geographic area licensed for operation) or when HeNB 120 determines that it should be configured in SLP 160.

HeNB 120 may establish a secure IP connection to SLP 160 using its embedded UE ID (step 1). HeNB may obtain the address of SLP 160 (e.g., a fully qualified domain name or an IP address of SLP 160) for the secure IP connection from information configured in HeNB 120 (e.g., by HeMS 134) in association with the embedded UE. SLP 160 may recognize the UE ID of the embedded UE as being for HeNB 120 (step 2). HeNB 120 may thereafter initiate a SUPL location session with SLP 160 by sending a SUPL START message to SLP 160 (step 3). This SUPL message may include a Location ID element, an initial location estimate for HeNB 120 if available, SUPL capabilities of HeNB 120, QoP of a requested location estimate for HeNB 120, and/or other information. The Location ID element may include an ECGI of HeNB 120, a list of neighbor cells detected by HeNB 120, measurements of the neighbor cells made by HeNB 120 (e.g., signal strength and signal quality), etc.

SLP 160 may receive the SUPL START message and may configure HeNB 120 using the embedded UE ID, the ECGI, the HeNB location, the IP address of HeNB 120, the neighbor cell information, and/or other information received from HeNB 120 (step 4). SLP 160 may perform positioning for HeNB 120 via steps 5 to 7. For example, SLP 160 may perform positioning if HeNB 120 did not provide a sufficiently accurate location in step 3 and SLP 160 was not able to compute a sufficiently accurate location for HeNB 120 from information in the Location ID element. Alternatively, SLP 160 may skip positioning and proceed to step 8.

SLP 160 may send a SUPL RESPONSE message to HeNB 120 to initiate positioning of HeNB 120 (step 5). This SUPL message may include a selected positioning method, the SUPL capabilities of SLP 160, and/or other information. HeNB 120 may receive the SUPL RESPONSE message and may make measurements for the selected positioning method. HeNB 120 may then send a SUPL POS INIT message to SLP 160 (step 6). This SUPL message may include a Location ID element carrying the ECGI of HeNB 120, a list of neighbor cells detected by HeNB 120, measurements of the neighbor cells (e.g., signal strength and signal quality) made by HeNB 120 (e.g., for ECID), a request for assistance data for A-GNSS and/or other positioning methods, and/or other information. In some versions of SUPL (e.g., SUPL version 3.0), the SUPL POS INIT message in step 6 may carry one or more LPP or LPP/LPPe positioning messages (not shown in FIG. 9), which may carry LPP and LPPe positioning capabilities of HeNB 120, a request for assistance data (e.g., for A-GNSS), and/or measurements made by HeNB 120 for A-GNSS, OTDOA, or some other positioning method. If SLP 160 is able to determine the location of HeNB 120 using measurements provided by HeNB 120 in step 6, then SLP 160 may proceed to step 8 and skip step 7. Otherwise, HeNB 120 and SLP 160 may communicate between each other SUPL POS messages carrying messages for a positioning protocol such as RRLP, LPP/LPPe, etc. (step 7). SLP 160 may terminate the SUPL location session (e.g., after determining the location of HeNB 120) by sending to HeNB 120 a SUPL END message, which may include a location estimate for HeNB 120 if obtained (step 8).

Figure 10:
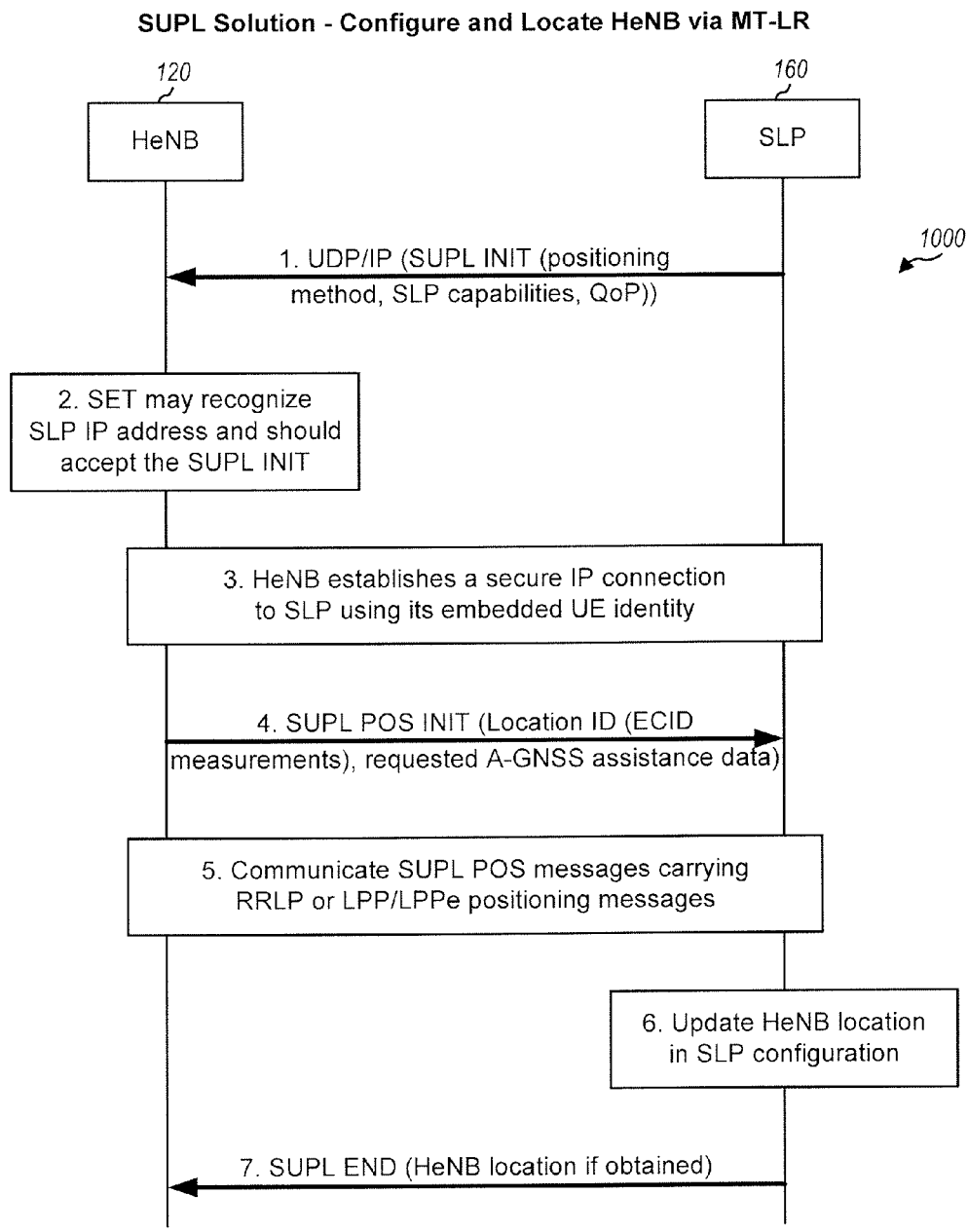

FIG. 10 shows a design of a message flow 1000 for positioning HeNB 120 via MT-LR in SUPL with HeNB 120 having an embedded UE for the third scheme. The procedure in FIG. 10 may be invoked by SLP 160 when SLP 160 needs to obtain or verify the location of HeNB 120 (e.g., as part of verifying or updating configuration information in SLP 160 for HeNB 120). SLP 160 may initiate a SUPL location session with HeNB 120 by sending a SUPL INIT message to HeNB 120 via UDP/IP (as shown in FIG. 10) or via SMS, SIP Push, or some other method (not shown in FIG. 10) (step 1). This SUPL message may include a selected positioning method, SUPL capabilities of SLP 160, QoP of a requested location estimate for HeNB 120, and/or other information. HeNB 120 may recognize the IP address of SLP 160 (e.g., because the IP address is configured in HeNB 120) and accept the SUPL INIT message (step 2).

HeNB 120 may establish a secure IP connection to SLP 160 using its embedded UE ID (step 3). HeNB 120 may then send a SUPL POS INIT message to SLP 160 (step 4). This SUPL message may include a Location ID element, SUPL capabilities of HeNB 120, a request for assistance data for A-GNSS or other positioning methods, an initial location estimate for HeNB 120, and/or other information. The Location ID element may include an ECGI for HeNB 120, a list of neighbor cells detected by HeNB 120, measurements of the neighbor cells (e.g., for ECID), etc. The SUPL POS INIT message may carry one or more LPP or LPP/LPPe positioning messages, which may carry LPP and LPPe positioning capabilities of HeNB 120, a request for assistance data (e.g., for A-GNSS), measurements made by HeNB 120 for A-GNSS, OTDOA, or some other positioning method, and/or other information. If SLP 160 is able to determine the location of HeNB 120 using measurements provided by HeNB 120 in step 4, then SLP 160 may proceed to step 6 and skip step 5.

HeNB 120 and SLP 160 may thereafter communicate between each other SUPL POS messages carrying messages for a positioning protocol such as RRLP, LPP/LPPe, etc. (step 5). Once SLP 160 is able to determine a location estimate for HeNB 120 from location information (e.g., location measurements or a location estimate) provided by HeNB 120 in step 4 and/or step 5, SLP 160 may update its configuration database with this location estimate (step 6). SLP 160 may terminate the SUPL location session by sending to HeNB 120 a SUPL END message, which may include the location estimate for HeNB 120 (step 7).

In the fourth scheme, HeNB positioning and HeNB configuring in a location server may be supported with O&M using an embedded UE in a HeNB. In one design, a HeNB (e.g., HeNB 120) may first obtain its location (e.g., using one of the other schemes) and may then provide its location to a HeMS (e.g., HeMS 134). The HeMS may then configure a location server (e.g., an E-SMLC and/or an SLP) with the location of the HeNB. If the second or third scheme is used to obtain the HeNB location, then the HeMS may also configure the embedded UE ID of the HeNB in the location server. The fourth scheme may avoid impact to location servers associated with the other schemes to support configuring of HeNBs in the location servers. In the fourth scheme, the HeNB may obtain its location using (i) MO-LR as in the second scheme, with the HeNB having an embedded UE (e.g., as shown in FIG. 7) and/or (ii) SUPL MO-LR and/or MT-LR as in the third scheme, with the HeNB having an embedded UE (e.g., as shown in FIGS. 9 and 10).

Table 3 summarizes various features supported by the first, second and third schemes described above. These schemes may support positioning of a HeNB initiated by the HeNB during or after initialization. The first and third schemes may also support positioning of the HeNB initiated by a location server after initialization. All three schemes may allow use of control plane location and SUPL.

TABLE 3

| Feature | First Scheme (LPPa) | Second Scheme (MO-LR) | Third Scheme (SUPL) |
|---|---|---|---|
| HeNB initiated positioning at initialization | Note 1 | Note 1 | Yes |
| HeNB initiated positioning after initialization | Yes | Yes | Yes |
| Location server initiated positioning after initialization | Yes | — | Yes |
| Compatible with use of control plane location | Yes | Yes | Note 2 |
| Compatible with use of SUPL | Note 2 | Note 2 | Yes |

Note 1:
LPPa or MO-LR may be used immediately after initialization to obtain and verify the HeNB location before the HeNB starts to provide normal services.
Note 2:
compatible if a network operator supports both control plane location and SUPL and if E-SMLC and SLP are combined or connected.

The techniques and schemes described herein may provide various advantages. First, configuring a HeNB (e.g., a HeNB ID, a HeNB an ECGI, and a HeNB location) in a location server (e.g., an E-SMLC and/or an SLP) may be supported. Conventionally, only some HeNBs may be known to a location server via O&M (e.g., HeNBs serving UEs from which emergency calls happen to be originated where the HeNB location was then obtained by the location server using LPPa and subsequently configured in the location server). With the techniques described herein, more or all HeNBs (and their locations) may be configured in a location server, which may help positioning of UEs and/or HeNBs that can receive signals from these HeNBs.

Second, reliable and accurate location of a HeNB may be obtained (i) at initialization to verify that the HeNB is located in a licensed area and/or (ii) after initialization to detect possible movement, improve initial location accuracy, and possibly help locate another HeNB (e.g., a HeNB that can receive and measure signals from an already located HeNB). The accurate HeNB location may enable more accurate determination of the location of UEs and/or other HeNBs based on the HeNB location. For example, the location of the HeNB may be used as a location estimate for a UE or may be used to compute a location estimate for the UE. UE positioning based on the HeNB location may be important since ECID and OTDOA may not work well for the UE and A-GNSS may be hampered for the UE due to poor indoor signal reception.

Third, new positioning methods may be supported to determine HeNB location. For example, HeNB location may be supported based on OTDOA or ECID measurements made by many HeNBs in the same local area. The new positioning methods may rely on interaction between HeNBs and one or more location servers. This interaction may be supported by the positioning protocols used by the schemes described herein.

Fourth, broadcast of HeNB location information obtained based on the schemes described herein may be supported, e.g., to assist positioning of UEs and/or other HeNBs. For example, the location of a HeNB and/or A-GNSS fine timing may be provided to UEs via broadcast from a HeNB.

All four schemes described above enable positioning of a HeNB using LPP or combined LPP/LPPe positioning protocol between the HeNB (e.g., HeNB 120) and a location server (e.g., E-SMLC 150 or SLP 160). The HeNB may then be positioned in a similar manner to positioning of a UE when a control plane or a user plane location solution is used to position the UE with LPP or combined LPP/LPPe positioning protocol. In particular, various positioning methods supported by LPP and LPPe may be applicable to positioning of the HeNB. Furthermore, because HeNB location typically does not change, positioning methods may be employed that rely on measurements made by the HeNB at different times, thereby avoiding the need to make all measurements at the same time as is normally required for a UE, which may be subject to movement. For example, if the number of GNSS satellites from which the HeNB can receive signals is insufficient to obtain a location estimate, the HeNB may measure signals from additional GNSS satellites at a later time and either provide the additional measurements to a location server or compute a location estimate based on the additional measurements. The provision of measurements made at different times by the HeNB to the location server and/or the provision of assistance data from the location server to the HeNB to assist such measurements may be supported by any of the schemes described herein.

In another application of the schemes described herein, there may be a group of HeNBs within a local area (e.g., within an office building, a shopping mall, an apartment complex, a hotel, etc.) where the locations of some or all of the HeNBs in the group are unknown and need to be determined. Each HeNB in the group may be able to measure signals (e.g., signal strength and/or signal timing) from some of the other HeNBs in the group as well as signals from nearby base stations (e.g., eNodeBs). A location server (e.g., an E-SMLC or a SLP) may then obtain measurements or a location estimate (e.g., using LPP or LPP/LPPe) from each HeNB in the group using one of the schemes described herein. For some HeNBs in the group, either the location server or the HeNB may be able to determine the location of a HeNB using only the measurements obtained by the HeNB, e.g., if the measurements were obtained for GNSS satellites or base stations whose locations are already known. For some other HeNBs in the group, it may not be possible to determine the location of a HeNB using only the measurements obtained by the HeNB, e.g., if the measurements are of signals from other HeNBs whose locations are not known and if there are insufficient measurements of GNSS satellites, base stations, and/or HeNBs whose locations are known. However, by combining all of the measurements provided by all HeNBs in the group, it may be possible to determine the location of each HeNB whose location could not be determined using just the measurements obtained by that HeNB. This may be achieved using equations that relate the locations of several HeNBs to the measurements provided. If the overall number of measurements exceeds the number of unknown coordinates for all unknown HeNB locations, then it may be possible to solve these equations for all unknown coordinates. The schemes described herein may be used to provide measurements from the HeNBs to the location server either at the request of each HeNB (e.g., using an MO-LR location procedure as in FIGS. 4, 7 and 9) or at the request of the location server (e.g., using an MT-LR location procedure as in FIGS. 5 and 10).

FIG. 11 shows a design of a process 1100 for supporting location of a HeNB. Process 1100 may be performed by the HeNB, or a location server, or some other entity. LPP messages may be communicated between the HeNB and the location server (block 1112). The LPP messages may be terminated at the HeNB (instead of a UE) and the location server. At least one location transaction for the HeNB may be performed based on the LPP messages, e.g., at or after initialization of the HeNB (block 1114).

In one design, block 1112 may correspond to steps 1-3 in FIG. 3 and steps 1-3 and 5-7 in FIG. 4 or 5. Block 1114 may correspond to step 4 in FIG. 3, 4 or 5. In another design, block 1112 may correspond to steps 2-4, 6-8, and 10-12 in FIG. 7. Block 1114 may correspond to step 5 or step 9 in FIG. 7. In yet another design, block 1112 may correspond to step 6 and/or step 7 in FIG. 9 or step 4 and/or step 5 in FIG. 10. Block 1114 may correspond to step 7 in FIG. 9 or step 6 in FIG. 10.

In one design, transport messages carrying the LPP messages may be generated and communicated between the HeNB and the location server. The transport messages may comprise LPPa messages (e.g., as shown in FIGS. 3, 4 and 5), or NAS messages (e.g., as shown in FIG. 7), or SUPL messages (e.g., as shown in FIGS. 9 and 10).

In one design, the at least one location transaction for the HeNB may comprise positioning of the HeNB, and the LPP messages may be communicated for positioning of the HeNB. The LPP messages may comprise an LPP message carrying a request for assistance data from the location server, or assistance data from the location server, or a request for measurements from the HeNB, or measurements from the HeNB, or a request for a location estimate from the HeNB or the location server, or a location estimate from the HeNB or the location server, or a request for the positioning capabilities of the HeNB or the location server, or a combination thereof. Configuring the HeNB in the location server may be part of the at least one location transaction for the HeNB in block 1114 or may be a separate transaction.

In one design, messages may be communicated between the HeNB and the location server to configure the HeNB in the location server. These messages may comprise (i) the LPPa HeNB Configuration Request message and the LPPa HeNB Configuration Response message in steps 1 and 7 in FIG. 3, (ii) the MO-LR Request message and the MO-LR Response message in steps 2 and 16 in FIG. 7, or (iii) the SUPL START message and the SUPL END message in steps 3 and 8 in FIG. 9.

The location server may be unaware of the presence of the HeNB prior to configuring of the HeNB. In one design, the HeNB may send a message to initiate configuring of the HeNB in the location server (e.g., in step 1 in FIG. 3, step 2 in FIG. 7, or step 3 in FIG. 9). This message may comprise an identity of the HeNB and/or a location of the HeNB (e.g., for scheme 1 described above). In another design, the message may be associated with a HeNB identity that is either (i) already known to an SLP due to secure IP connection establishment (for scheme 3) or (ii) provided to an E-SMLC when the HeNB location request is forwarded by an MME (for scheme 2). The message may instigate location of the HeNB for all three schemes and/or may carry location measurements. The message may not always carry a location estimate. In one design, the HeNB may establish a connection with the location server or a designated network entity based on an identity of a UE embedded in the HeNB.

FIG. 12 shows a design of a process 1200 for supporting location of a HeNB. Process 1200 may be performed by the HeNB, or a location server, or some other entity. A location session between the HeNB and the location server may be established based on an embedded UE ID assigned to the HeNB (block 1212). The embedded UE ID may be recognized by the location server as being assigned to the HeNB instead of a UE. At least one location transaction for the HeNB may be performed during the location session, e.g., at or after initialization of the HeNB (block 1214). The at least one location transaction may comprise configuring the HeNB in the location server and/or positioning of the HeNB.

In one design, block 1212 may correspond to steps 2-4 in FIG. 7. Block 1214 may correspond to step 5, step 9, and/or step 13 in FIG. 7. In another design, block 1212 may correspond to step 1 in FIG. 9 or step 3 in FIG. 10. Block 1214 may correspond to step 4 and/or step 7 in FIG. 9 or step 5 and/or step 6 in FIG. 10.

In one design, the embedded UE ID may be an IMSI, an MSISDN, or an IMEI. In one design, the embedded UE ID may be within a predetermined range of UE IDs reserved for assignment to HeNBs. In this design, the location server can recognize the embedded UE ID as being for the HeNB (instead of a UE) without having to be configured with individual embedded UE IDs for all HeNBs. In another design, the location server may be configured with individual embedded UE IDs for HeNBs.

In one design, for the MO-LR solution in the second scheme, the HeNB may perform an attach procedure with the embedded UE ID to attach to an MME (e.g., in step 1 in FIG. 7). The HeNB may appear as a UE to the MME, which may be unaware that the attachment is actually performed by a HeNB. Messages may be communicated between the HeNB and the location server via the MME during the location server, and the MME may be unaware of the messages being communicated by the HeNB instead of a UE. In one design, the HeNB may send a message to the location server to initiate an MO-LR location session (e.g., in step 2 in FIG. 7).

In one design, the HeNB may be assigned a single embedded UE ID. In this design, the MME may associate this embedded UE ID with the location server, and the HeNB may configure itself with this location server based on the embedded UE ID. In another design, the HeNB may be assigned a plurality of embedded UE IDs. In this design, the MME may associate the plurality of embedded UE IDs with a plurality of location servers, and the HeNB may configure itself with each of the plurality of location servers based on a different one of the plurality of embedded UE IDs.

In one design, for the SUPL solution in the third scheme, a secure data connection may be established between the HeNB and the location server based on the embedded UE ID (e.g., in step 1 in FIG. 9 or step 3 in FIG. 10). The HeNB may send a message to the location server to initiate a SUPL location session (e.g., in step 3 in FIG. 9). Alternatively, the location server may send a message to the HeNB to initiate a SUPL location session (e.g., in step 1 in FIG. 10).

In one design, establishing a location session in block 1212 and performing at least one location transaction in block 1214 may be performed by the HeNB. In another design, establishing a location session and performing at least one location transaction may be performed by the location server. The location server may detect the embedded UE ID being assigned to the HeNB instead of a UE and may configure the HeNB in the location server, e.g., by storing pertinent information such as the embedded UE ID and/or an ECGI of the HeNB, the location of the HeNB, and/or other information for the HeNB.

Figure 13:
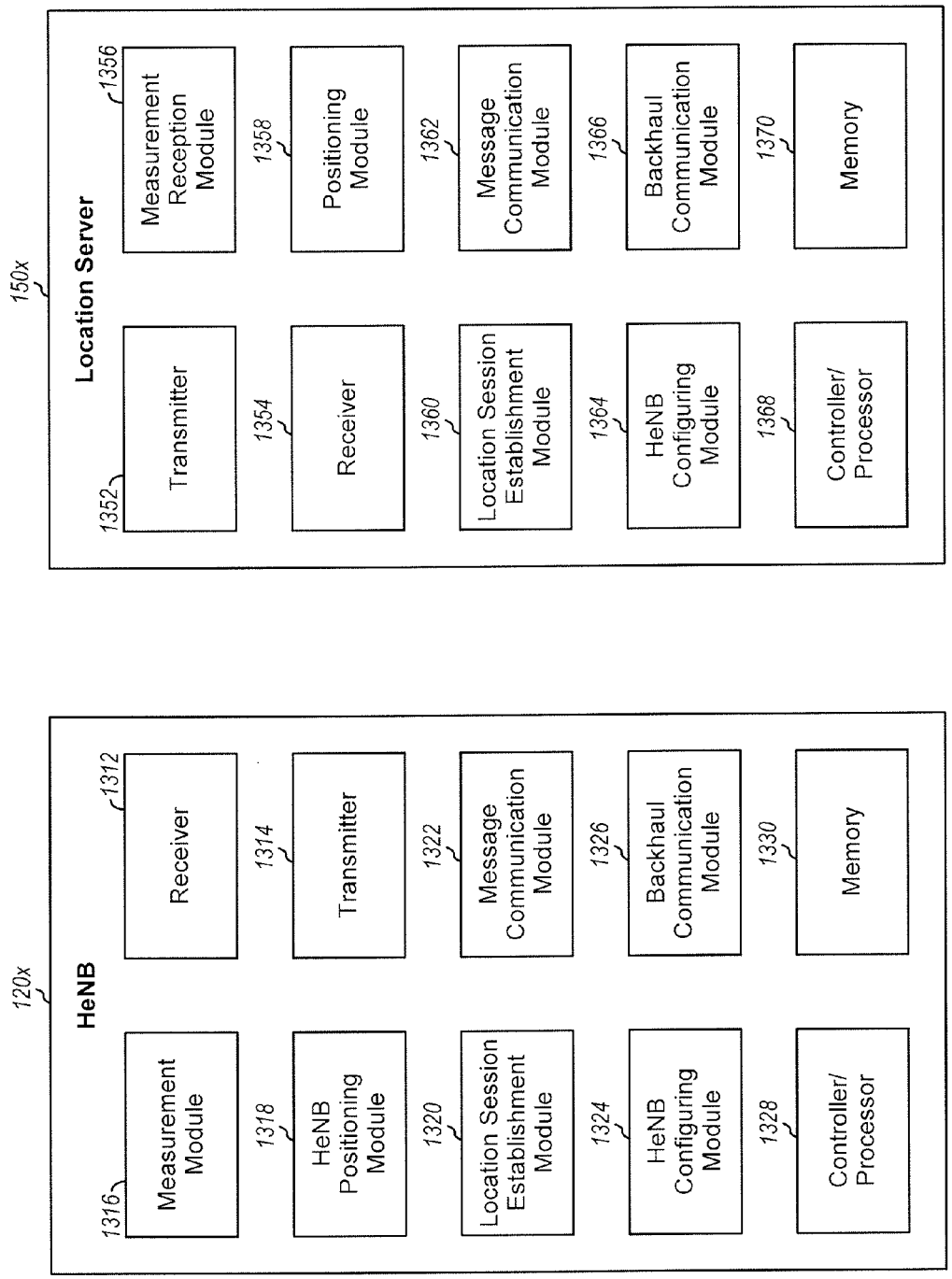
FIG. 13 shows a block diagram of a HeNB and a location server.

FIG. 13 shows a block diagram of a design of a HeNB 120x and a location server 150x. HeNB 120x may be one design of HeNB 120 in FIG. 1. Location server 150x may be one design of E-SMLC 150 or SLP 160 in FIG. 1.

Within HeNB 120x, a receiver 1312 may receive signals from UEs, base stations, other HeNBs, satellites, and/or other transmitting entities. A transmitter 1314 may transmit signals to UEs and/or other receiving entities. A module 1316 may make measurements of received signals for use to determine the location of HeNB 120x. A module 1318 may support positioning of HeNB 120x based on the measurements and/or other information. A module 1320 may establish a location session for HeNB 120x with location server 150x. A module 1322 may communicate messages with location server 150x during the location session. A module 1324 may configure HeNB 120x in location server 150x and/or other location servers. A module 1326 may support communication with network entities, e.g., HeNB Gateways, MMEs, location servers, etc. The various modules within HeNB 120x may operate as described above. A controller/processor 1328 may direct the operation of various modules within HeNB 120x. A memory 1330 may store data and program codes for HeNB 120x. The modules and/or controller 1328 within HeNB 120x may perform processing for HeNB 120 in message flow 300 in FIG. 3, message flow 400 in FIG. 4, message flow 500 in FIG. 5, message flow 700 in FIG. 7, message flow 900 in FIG. 9, message flow 1000 in FIG. 10, process 1100 in FIG. 11, process 1200 in FIG. 12, and/or other message flows and processes for the techniques described herein.

Within location server 150x, a transmitter 1352 and a receiver 1354 may support bi-directional communication with HeNBs and/or other entities. A module 1356 may receive measurements from HeNB 120x and/or other entities. A module 1358 may support positioning and may determine the location of HeNB 120x based on the measurements and/or other information available for HeNB 120x. A module 1360 may establish a location session for HeNB 120x. A module 1362 may communicate messages with HeNB 120x for the location session. A module 1364 may configure HeNB 120x in location server 150x and may store pertinent information for HeNB 120x, e.g., a HeNB ID, an embedded UE ID, a HeNB location, etc. A module 1366 may support communication with network entities such as MMEs, IP routers, etc. The various modules within location server 150x may operate as described above. A controller/processor 1368 may direct the operation of various modules within location server 150x. A memory 1370 may store data and program codes for location server 150x. The modules and/or controller 1368 within location server 150x may perform processing for E-SMLC 150 in message flows 300, 400, 500 and 700 in FIGS. 3, 4, 5 and 7, respectively, and/or processing for SLP 160 in message flows 900 and 1000 in FIGS. 9 and 10, respectively. The modules and/or controller 1368 within location server 150x may also perform process 1100 in FIG. 11, process 1200 in FIG. 12, and/or other message flows and processes for the techniques described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or a combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of supporting location of a Home evolved Node B (HeNB), comprising:
    establishing a location session between the HeNB and a location server based on an embedded User Equipment (UE) identity (ID) assigned to the HeNB, the embedded UE ID being recognized by the location server as being assigned to the HeNB instead of a UE;
    communicating, from the HeNB to the location server, measurements made by the HeNB in accordance with a positioning method included in a message previously communicated to the HeNB by the location server;
    performing at least one location transaction for the HeNB during the location session, including determining the location of the HeNB using the measurements made by the HeNB; and
    performing an attach procedure with the embedded UE ID to attach the HeNB to a Mobility Management Entity (MME), the HeNB appearing as a UE to the MME.

2. The method of claim 1, wherein the embedded UE ID is within a predetermined range of UE IDs reserved for assignment to HeNBs.

3. The method of claim 1, further comprising:
    communicating messages between the HeNB and the location server via the MME during the location server, the MME being unaware of the messages being communicated by the HeNB instead of a UE.

4. The method of claim 1, wherein the HeNB is assigned a plurality of embedded UE IDs, wherein the MME associates the plurality of embedded UE IDs with a plurality of location servers, and wherein the HeNB configures itself with each of the plurality of location servers based on a different one of the plurality of embedded UE IDs.

5. The method of claim 1, wherein the establishing a location session comprises sending a message by the HeNB to the location server to initiate a Mobile Originated Location Request (MO-LR) location session.

6. The method of claim 1, further comprising:
    establishing a secure data connection between the HeNB and the location server based on the embedded UE ID, the location server recognizing the embedded UE ID being for the HeNB instead of a UE.

7. The method of claim 1, wherein the establishing a location session comprises sending a message by the HeNB to the location server to initiate a Secure User Plane Location (SUPL) location session.

8. The method of claim 1, wherein the establishing a location session comprises receiving a message from the location server to the HeNB to initiate a Secure User Plane Location (SUPL) location session.

9. The method of claim 1, wherein the performing at least one location transaction comprises configuring the HeNB in the location server, or performing positioning of the HeNB, or both at initialization of the HeNB.

10. The method of claim 1, wherein the establishing a location session and the performing at least one location transaction are performed by the HeNB.

11. The method of claim 1, wherein the establishing a location session and the performing at least one location transaction are performed by the location server.

12. The method of claim 11, further comprising:
    detecting the embedded UE ID being assigned to the HeNB instead of a UE by the location server; and
    configuring the HeNB in the location server.

13. An apparatus for supporting location of a Home evolved Node B (HeNB), comprising:
    means for establishing a location session between the HeNB and a location server based on an embedded User Equipment (UE) identity (ID) assigned to the HeNB, the embedded UE ID being recognized by the location server as being assigned to the HeNB instead of a UE;
    means for communicating, from the HeNB to the location server, measurements made by the HeNB in accordance with a positioning method included in a message previously communicated to the HeNB by the location server;
    means for performing at least one location transaction for the HeNB during the location session, including determining the location of the HeNB using the measurements made by the HeNB; and means for performing an attach procedure with the embedded UE ID to attach the HeNB to a Mobility Management Entity (MME), the HeNB appearing as a UE to the MME.

14. The apparatus of claim 13, further comprising:
means for establishing a secure data connection between the HeNB and the location server based on the embedded UE ID, the location server recognizing the embedded UE ID being for the HeNB instead of a UE.

15. The apparatus of claim 13, wherein the means for performing at least one location transaction comprises means for configuring the HeNB in the location server, or performing positioning of the HeNB, or both at initialization of the HeNB.

16. An apparatus for supporting location of a Home evolved Node B (HeNB), comprising:
at least one processor configured to:
establish a location session between the HeNB and a location server based on an embedded User Equipment (UE) identity (ID) assigned to the HeNB, the embedded UE ID being recognized by the location server as being assigned to the HeNB instead of a UE;
communicate, from the HeNB to the location server, measurements made by the HeNB in accordance with a positioning method included a message previously communicated to the HeNB by the location server;
perform at least one location transaction for the HeNB during the location session, including determine the location of the HeNB using the measurements made by the HeNB; and
perform an attach procedure with the embedded UE ID to attach the HeNB to a Mobility Management Entity (MME), the HeNB appearing as a UE to the MME.

17. The apparatus of claim 16, wherein the at least one processor is configured to establish a secure data connection between the HeNB and the location server based on the embedded UE ID, the location server recognizing the embedded UE ID being for the HeNB instead of a UE.

18. The apparatus of claim 16, wherein the at least one processor is configured to perform at least one location transaction at initialization of the HeNB to configure the HeNB in the location server, or to perform positioning of the HeNB, or both.

19. A non-transitory computer-readable medium comprising:
code for establishing a location session between the HeNB and a location server based on an embedded User Equipment (UE) identity (ID) assigned to the HeNB, the embedded UE ID being recognized by the location server as being assigned to the HeNB instead of a UE;
code for communicating, from the HeNB to the location server, measurements made by the HeNB in accordance with a positioning method included in a message previously communicated to the HeNB by the location server;
code for perfoiming at least one location transaction for the HeNB during the location session, including determining the location of the HeNB using the measurements made by the HeNB; and
code for perfouning an attach procedure with the embedded UE ID to attach the HeNB to a Mobility Management Entity (MME), the HeNB appearing as a UE to the MME.

* * * * *